US012160055B2

(12) United States Patent
Yoshikawa

(10) Patent No.: US 12,160,055 B2
(45) Date of Patent: Dec. 3, 2024

(54) ANTENNA, WIRELESS COMMUNICATION MODULE, AND WIRELESS COMMUNICATION DEVICE

(71) Applicant: KYOCERA CORPORATION, Kyoto (JP)

(72) Inventor: Hiromichi Yoshikawa, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 266 days.

(21) Appl. No.: 17/621,692

(22) PCT Filed: Jun. 23, 2020

(86) PCT No.: PCT/JP2020/024641
§ 371 (c)(1),
(2) Date: Dec. 22, 2021

(87) PCT Pub. No.: WO2020/262394
PCT Pub. Date: Dec. 30, 2020

(65) Prior Publication Data

US 2022/0352634 A1 Nov. 3, 2022

(30) Foreign Application Priority Data

Jun. 25, 2019 (JP) ................................ 2019-117681

(51) Int. Cl.
*H01Q 1/24* (2006.01)
*H01Q 9/04* (2006.01)

(52) U.S. Cl.
CPC ............... *H01Q 9/045* (2013.01); *H01Q 1/24* (2013.01)

(58) Field of Classification Search
CPC .......... H01Q 9/045; H01Q 1/24; H01Q 21/12; H01Q 1/523; H01Q 1/521; H01Q 1/22; H01Q 1/36
See application file for complete search history.

(56) References Cited

U.S. PATENT DOCUMENTS 6,069,586 A 5/2000 Karlsson et al.
9,444,150 B2 9/2016 Hirobe et al.
(Continued)

FOREIGN PATENT DOCUMENTS

CN 105210232 A 12/2015
JP 2017504274 A 2/2017

*Primary Examiner* — Hai V Tran
*Assistant Examiner* — Michael M Bouizza
(74) *Attorney, Agent, or Firm* — HAUPTMAN HAM, LLP

(57) ABSTRACT

An antenna includes first and second antenna elements, and first and second coupling bodies. The first and second antenna elements respectively include first and second radiation conductors and first and second feed lines, and respectively resonate in first and second frequency bands. The first and second radiation conductors are arranged side-by-side at an interval equal to or shorter than ½ a resonance wavelength. The first and second radiation conductors are coupled under a first coupling mode in which one of capacitive coupling and magnetic field coupling is dominant. The first coupling body couples first end portions of the first and second radiation conductors under a second coupling mode different from the first coupling mode. The second coupling body couples second end portions of the first and second radiation conductors, opposite to the first end portions, under the second coupling mode.

18 Claims, 15 Drawing Sheets

(56) References Cited

U.S. PATENT DOCUMENTS

| | | | | |
|---|---|---|---|---|
| 10,033,088 | B2 | 7/2018 | Zhang et al. | |
| 2004/0155723 | A1* | 8/2004 | Koriyama | H01P 5/107<br>333/26 |
| 2008/0174508 | A1 | 7/2008 | Iwai et al. | |
| 2015/0255849 | A1 | 9/2015 | Sumiyosi et al. | |
| 2017/0084990 | A1 | 3/2017 | Le Thuc et al. | |
| 2017/0149146 | A1 | 5/2017 | Montgomery et al. | |
| 2019/0131701 | A1 | 5/2019 | Watanabe et al. | |
| 2021/0384634 | A1* | 12/2021 | Yoshikawa | H01Q 15/006 |
| 2021/0384644 | A1* | 12/2021 | Yoshikawa | H01Q 9/0478 |

* cited by examiner

ANTENNA, WIRELESS COMMUNICATION MODULE, AND WIRELESS COMMUNICATION DEVICE

RELATED APPLICATIONS

The present application is a National Phase of International Application No. PCT/JP2020/024641 filed Jun. 23, 2020, which claims priority to Japanese Application No. 2019-117681, filed Jun. 25, 2019.

TECHNICAL FIELD

The present disclosure relates to an antenna, a wireless communication module, and a wireless communication device.

BACKGROUND ART

In an array antenna or an antenna for technology such as Multiple-Input Multiple-Output (MIMO), a plurality of antenna elements are arranged close to each other. When a plurality of antenna elements are arranged close to each other, mutual coupling between the antenna elements may be large. Such large mutual coupling between the antenna elements may result in compromised radiation efficiency of the antenna elements.

In view of this, a technique for reducing mutual coupling between antenna elements has been proposed (for example, Patent Document 1).

CITATION LIST

Patent Literature

Patent Document 1: JP 2017-504274 A

SUMMARY OF INVENTION

Technical Problem

The known technique for reducing mutual coupling between antenna elements has room for improvement.

An object of the present disclosure is to provide an antenna, a wireless communication module, and a wireless communication device achieving reduced mutual coupling between antenna elements.

Solution to Problem

An antenna according to an embodiment of the present disclosure includes:

- a first antenna element including a first radiation conductor and a first feed line, the first antenna element being configured to resonate in a first frequency band;
- a second antenna element including a second radiation conductor and a second feed line, the second antenna element being configured to resonate in a second frequency band;
- a first coupling body; and
- a second coupling body, in which
- the first radiation conductor and the second radiation conductor are arranged side by side at an interval that is equal to or shorter than ½ of a resonance wavelength,
- the second radiation conductor is coupled to the first radiation conductor under a first coupling mode in which one of capacitive coupling and magnetic field coupling is dominant,

- the first coupling body couples a first end portion of the first radiation conductor on a side of a first direction and a first end portion of the second radiation conductor on the side of the first direction to each other under a second coupling mode different from the first coupling mode, and
- the second coupling body couples a second end portion of the first radiation conductor opposite to the first end portion and a second end portion of the second radiation conductor opposite to the first end portion to each other under the second coupling mode.

A wireless communication module according to an embodiment of the present disclosure includes:

- the antenna described above; and
- an RF module electrically connected to at least one of the first feed line and the second feed line.

A wireless communication device according to an embodiment of the present disclosure includes:

- the wireless communication module described above; and
- a battery configured to supply power to the wireless communication module.

Advantageous Effects of Invention

With an antenna, a wireless communication module, and a wireless communication device according to an embodiment of the present disclosure, mutual coupling between antenna elements can be reduced.

DESCRIPTION OF EMBODIMENTS

Figure 1:
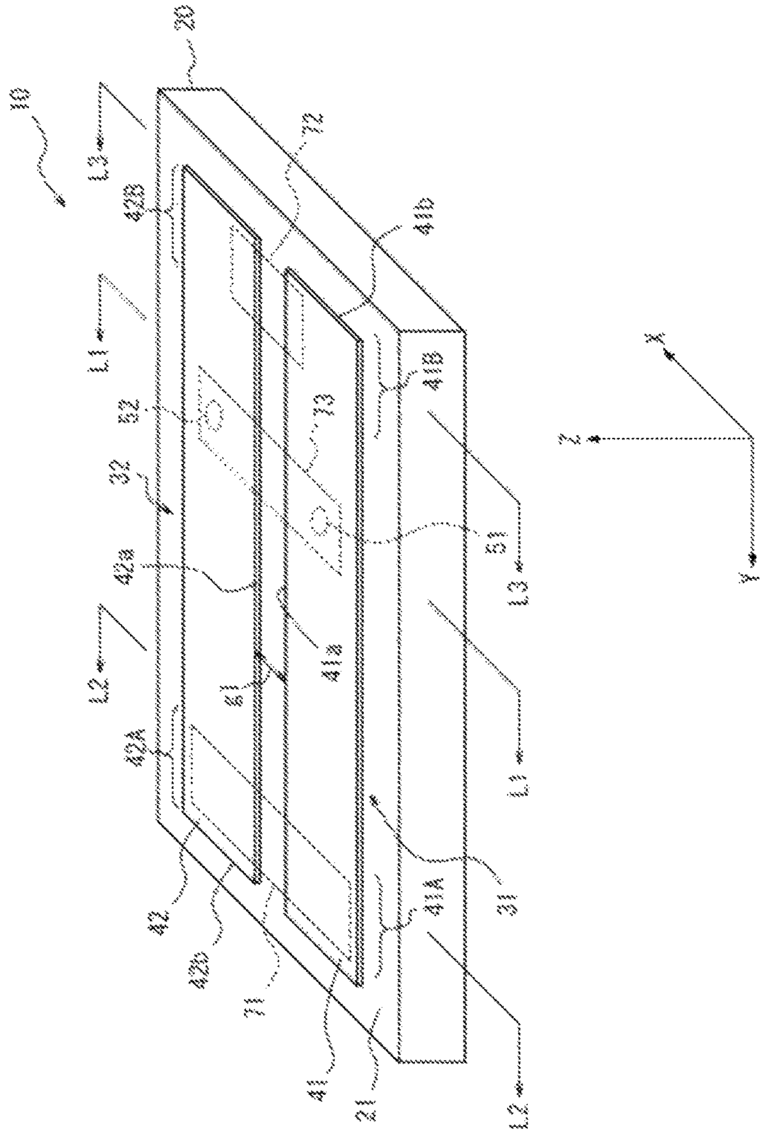
FIG. 1 is a perspective view of an antenna according to an embodiment of the present disclosure.

In the present disclosure, each requirement performs an executable operation. Thus, in the present disclosure, the operation performed by each requirement may mean that the requirement is configured to be able to perform that operation. In the present disclosure, a case where each requirement performs an operation may be paraphrased as appropriate as the requirement being configured to be able to perform the operation. In the present disclosure, an operation capable of being performed by each requirement can be paraphrased as appropriate as a requirement including or having that requirement being capable of performing the operation. In the present disclosure, a case where one requirement causes another requirement to perform an operation may mean that the one requirement is configured to be able to cause the other requirement to perform the operation. In the present disclosure, a case where one requirement causes another requirement to perform an operation may be paraphrased as the one requirement being configured to control the other requirement such that the other requirement can perform the operation. In the present disclosure, operations, among the operations performed by each requirement, that are not described in the claims may be understood as non-essential operations.

In the present disclosure, each requirement is in a functionally possible state. Thus, the functionally achieved state of each requirement may mean that each requirement is configured to be able to be achieved functionally. In the present disclosure, a case where each requirement is in a functional state may be paraphrased as appropriate as the requirement being configured to be in the functional state.

In the present disclosure, a “dielectric material” may include either a ceramic material or a resin material as its composition. Examples of the ceramic material include an aluminum oxide sintered body, an aluminum nitride sintered body, a mullite sintered body, a glass ceramic sintered body, crystallized glass in which crystalline components are precipitated in a glass matrix, and a microcrystalline sintered body, such as mica or aluminum titanate. Examples of the resin material include an epoxy resin, a polyester resin, a polyimide resin, a polyamide-imide resin, a polyetherimide resin, and a cured product of an uncured body such as a liquid crystal polymer.

In the present disclosure, a “conductive material” may include any of a metal material, an alloy of metal materials, a cured product of a metal paste, and an electrically conductive polymer as its composition. Examples of the metal material include copper, silver, palladium, gold, platinum, aluminum, chromium, nickel, cadmium lead, selenium, manganese, tin, vanadium, lithium, cobalt, and titanium. Examples of the alloy include a plurality of metal materials. Examples of the metal paste agent include a metal material powder kneaded together with an organic solvent and a binder. Examples of the binder include an epoxy resin, a polyester resin, a polyimide resin, a polyamide-imide resin, and a polyetherimide resin. Examples of the electrically conductive polymer include a polythiophene-based polymer, a polyacetylene-based polymer, a polyaniline-based polymer, and a polypyrrole-based polymer.

Embodiments of the present disclosure will be described below with reference to the drawings. The same components, among the components illustrated in FIG. 1 to FIG. 15, are denoted by the same reference signs.

In the embodiments of the present disclosure, the plane in which a first antenna element 31 and a second antenna element 32 illustrated in FIG. 1 and other figures extend is referred to as an XY plane. A direction from a first ground conductor 61 illustrated in FIG. 2 and other figures toward a first radiation conductor 41 illustrated in FIG. 1 and other figures is defined as a positive direction on the Z axis, and a direction opposite thereto is defined as a negative direction on the Z axis. The Y axis is defined to constitute the right-handed coordinate system. In the embodiments of the present disclosure, the positive direction on the X axis and the negative direction on the X axis are collectively referred to as the “X direction” when they are not particularly distinguished from each other. The positive direction on the Y axis and the negative direction on the Y axis are collectively referred to as the “Y direction” when they are not particularly distinguished from each other. The positive direction on the Z axis and the negative direction on the Z axis are collectively referred to as the “Z direction” when they are not particularly distinguished from each other.

In the following description, a first direction is defined as the positive direction on the Y axis in the embodiments of the present disclosure. A second direction is defined as the X direction. However, the first direction and the second direction may not be orthogonal to each other. It suffices if the first direction and the second direction intersect.

Example Structure of Antenna

Figure 2:
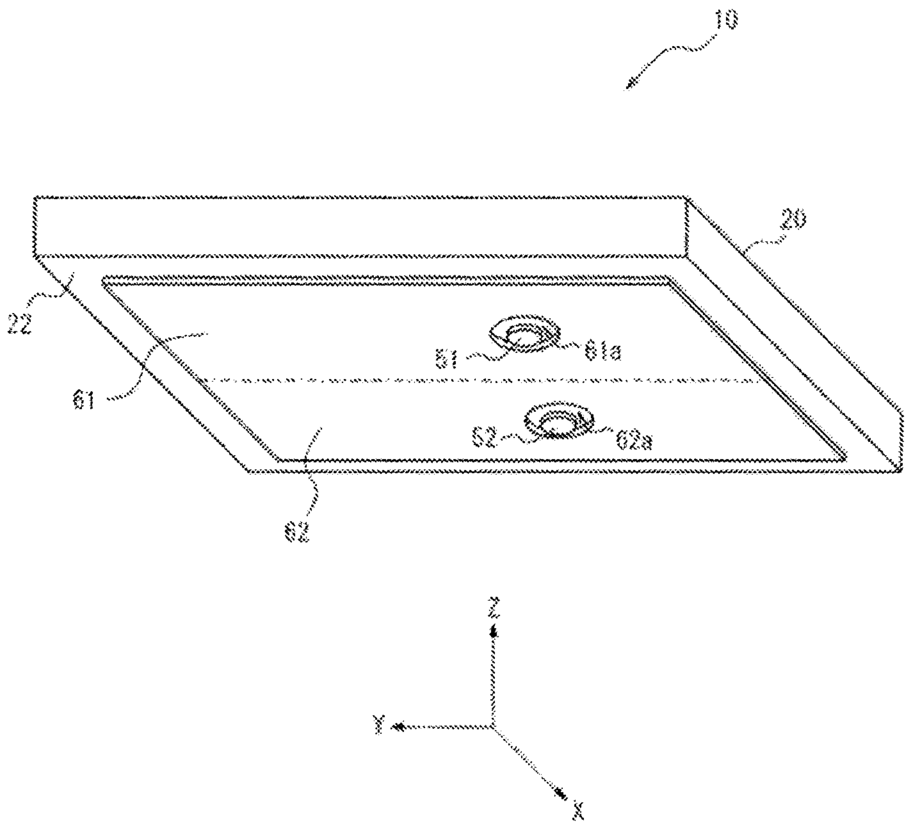
FIG. 2 is a perspective view of the antenna illustrated in FIG. 1, as viewed from the side of a negative direction on the Z axis.
Figure 3:
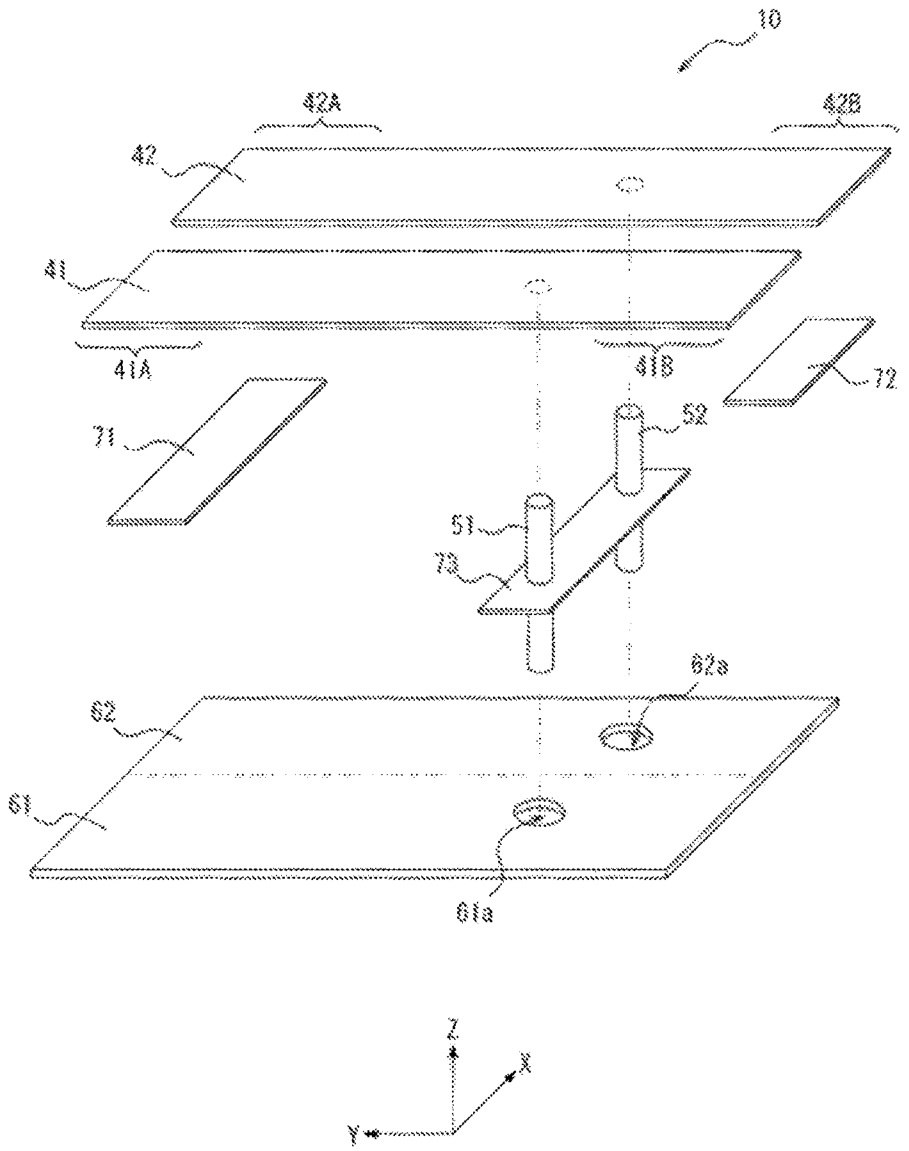
FIG. 3 is an exploded perspective view of a portion of the antenna illustrated in FIG. 1.
Figure 4:
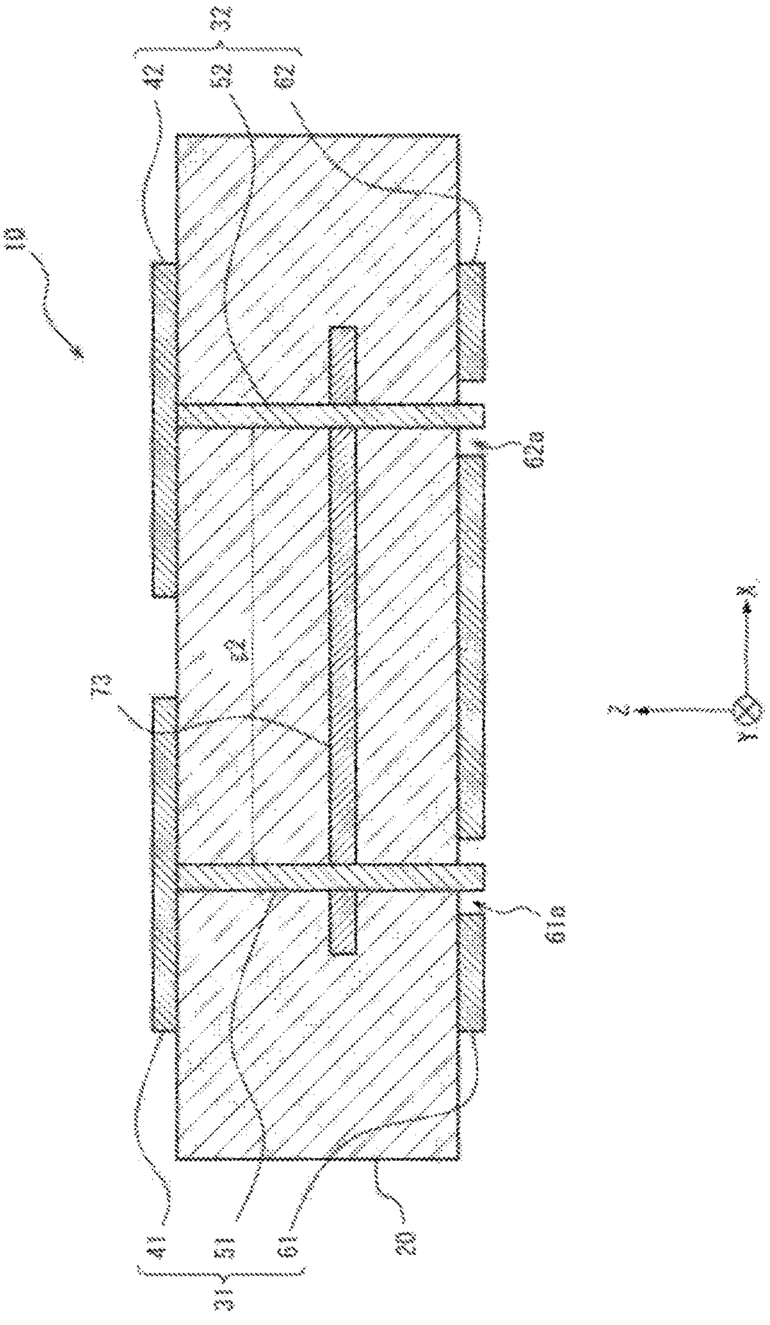
FIG. 4 is a cross-sectional view of the antenna taken along line L1-L1 in FIG. 1.
Figure 5:
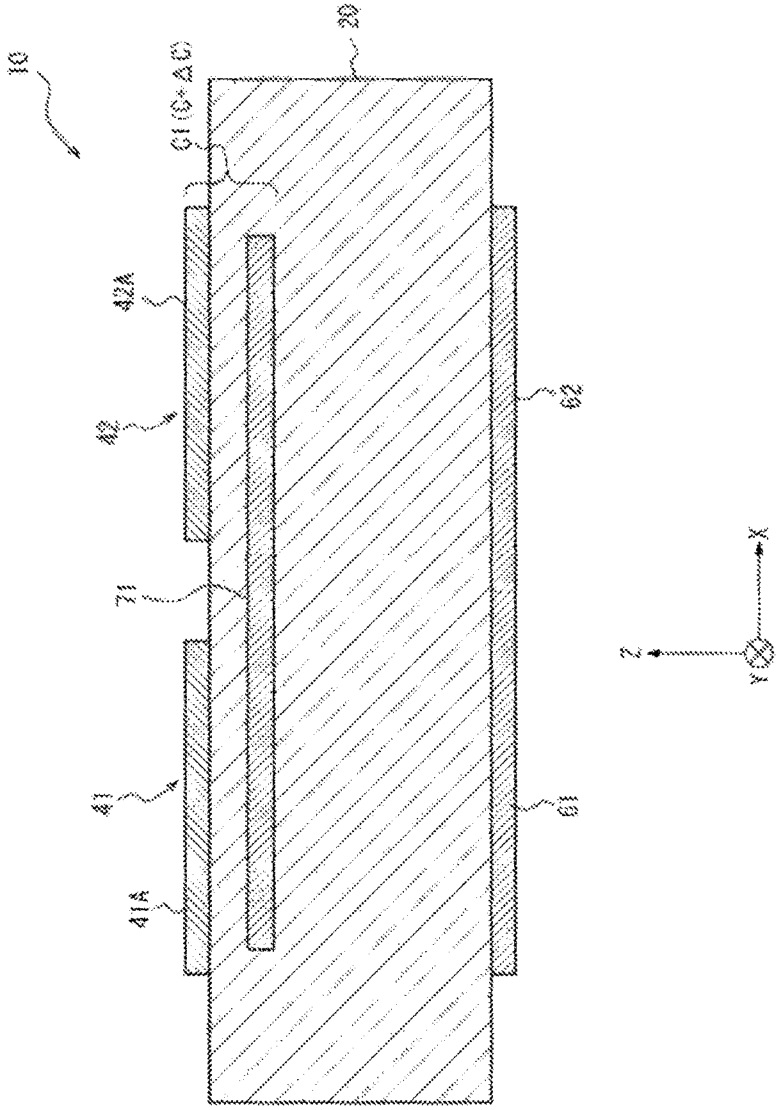
FIG. 5 is a cross-sectional view of the antenna taken along line L2-L2 in FIG. 1.
Figure 6:
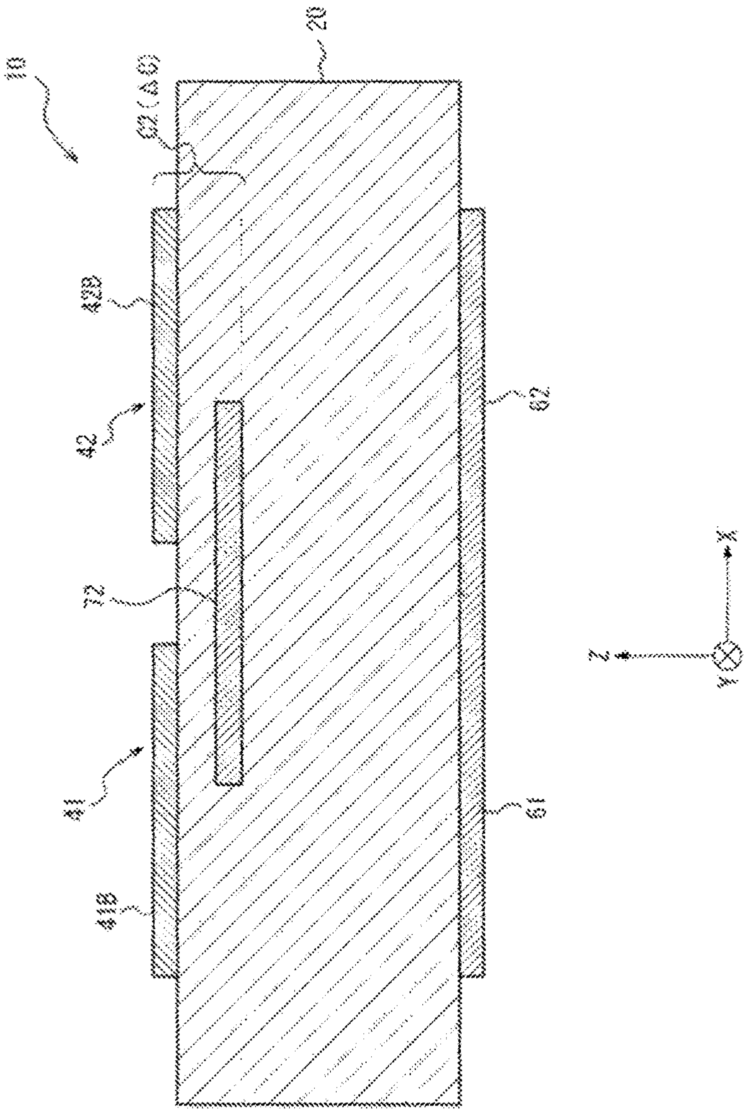
FIG. 6 is a cross-sectional view of the antenna taken along line L3-L3 in FIG. 1.

FIG. 1 is a perspective view of an antenna 10 according to an embodiment of the present disclosure. FIG. 2 is a perspective view of the antenna 10 illustrated in FIG. 1, as viewed from the side of the negative direction on the Z axis. FIG. 3 is an exploded perspective view of a portion of the antenna 10 illustrated in FIG. 1. FIG. 4 is a cross-sectional view of the antenna 10 taken along line L1-L1 in FIG. 1. FIG. 5 is a cross-sectional view of the antenna 10 taken along line L2-L2 in FIG. 1. FIG. 6 is a cross-sectional view of the antenna 10 taken along line L3-L3 in FIG. 1.

As illustrated in FIG. 1, the antenna 10 includes a base 20, the first antenna element 31, the second antenna element 32, a first coupling body 71, and a second coupling body 72. The antenna 10 may further include a third coupling body 73. Each of the first antenna element 31, the second antenna element 32, the first coupling body 71, the second coupling body 72, and the third coupling body 73 may include an electrically conductive material. Each of the first antenna element 31, the second antenna element 32, the first coupling body 71, the second coupling body 72, and the third coupling body 73 may include the same electrically conductive material or may include different electrically conductive materials.

The base 20 supports the first antenna element 31 and the second antenna element 32. As illustrated in FIG. 1 and FIG. 2, the base 20 has a substantially quadrangular prism shape. Note that the base 20 may have any shape as long as it is capable of supporting the first antenna element 31 and the second antenna element 32.

The base 20 may include a dielectric material. The relative permittivity of the base 20 may be appropriately adjusted according to the frequency used in the antenna 10. The base 20 includes an upper surface 21 and a lower surface 22, as illustrated in FIG. 1 and FIG. 2.

As illustrated in FIG. 4, the first antenna element 31 includes the first radiation conductor 41 and a first feed line 51. The first antenna element 31 may further include the first ground conductor 61. The first antenna element 31 includes the first ground conductor 61 to be an antenna of a microstrip type. As illustrated in FIG. 4, the second antenna element 32 includes a second radiation conductor 42 and a second feed line 52. The second antenna element 32 may further include a second ground conductor 62. The second antenna element 32 includes the second ground conductor 62 to be an antenna of a microstrip type. Each of the first radiation conductor 41, the second radiation conductor 42, the first feed line 51, the second feed line 52, the first ground conductor 61, and the second ground conductor 62 may include an electrically conductive material. Each of the first radiation conductor 41, the second radiation conductor 42, the first feed line 51, the second feed line 52, the first ground conductor 61, and the second ground conductor 62 may include the same electrically conductive material or may include different electrically conductive materials.

The first antenna element 31 resonates in a first frequency band. The second antenna element 32 resonates in a second frequency band. The first frequency band and the second frequency band may belong to the same frequency band or may belong to different frequency bands, depending on the application of the antenna 10 or the like. Depending on the application of the antenna 10 or the like, signals that cause excitation of the first antenna element 31 and the second antenna element 32 in the same phase may be fed to the first antenna element 31 and the second antenna element 32 from the first feed line 51 and the second feed line 52, respectively. Signals that cause excitation of the first antenna element 31 and the second antenna element 32 in different phases may be fed to the first antenna element 31 and the second antenna element 32 from the first feed line 51 and the second feed line 52, respectively.

The first radiation conductor 41 radiates, in the form of electromagnetic waves, power supplied from the first feed line 51, in the positive direction on the Z axis. The first radiation conductor 41 supplies, as power, electromagnetic waves from the side of the positive direction on the Z axis to the first feed line 51. The second radiation conductor 42 radiates, in the form of electromagnetic waves, power supplied from the second feed line 52 in the positive direction on the Z axis. The second radiation conductor 42 supplies, as power, electromagnetic waves from the side of the positive direction on the Z axis to the second feed line 52.

The first radiation conductor 41 and the second radiation conductor 42 may have a flat plate shape, as illustrated in FIG. 3. Each of the first radiation conductor 41 and the second radiation conductor 42 may extend along the XY plane. As illustrated in FIG. 1, each of the first radiation conductor 41 and the second radiation conductor 42 is located on the upper surface 21 of the base 20. The first radiation conductor 41 and the second radiation conductor 42 may be partially located inside the base 20.

In the present embodiment, the first radiation conductor 41 and the second radiation conductor 42 have rectangular shapes of the same type. The first radiation conductor 41 and the second radiation conductor 42 both have a longitudinal direction extending along the Y direction. The first radiation conductor 41 and the second radiation conductor both have a lateral direction extending along the X direction. Note that the first radiation conductor 41 and the second radiation conductor 42 may have any shape. The first radiation conductor 41 and the second radiation conductor may have different shapes to each other.

The first radiation conductor 41 has a long side **41*a* and a short side 41*b*. The first radiation conductor 41 includes a first end portion 41A and a second end portion 41B. The first end portion 41A is one of the two end portions of the first radiation conductor 41 in the longitudinal direction, on the side of the positive direction on the Y axis. The second end portion 41B is one of the two end portions of the first radiation conductor 41 in the longitudinal direction, on the side of the negative direction on the Y axis, and thus is an end portion on the side opposite to the first end portion 41**A.

The second radiation conductor 42 has a long side **42*a* and a short side 42*b*. The second radiation conductor 42 includes a first end portion 42A and a second end portion 42B. The first end portion 42A is one of the two end portions of the second radiation conductor 42 in the longitudinal direction, on the side of the positive direction on the Y axis. The second end portion 42B is one of the two end portions of the second radiation conductor 42 in the longitudinal direction, on the side of the negative direction on the Y axis, and thus is an end portion on the side opposite to the first end portion 42**A.

The first radiation conductor 41 and the second radiation conductor 42 are arranged side by side with the long side **41*a* and the long side 42*a* facing each other. However, a configuration in which the first radiation conductor 41 and the second radiation conductor 42 are arranged side by side is not limited to this. For example, the first radiation conductor 41 and the second radiation conductor 42 may be arranged side by side with a part of the long side 41*a* and a part of the long side 42*a* facing each other. In other words, the first radiation conductor 41 and the second radiation conductor 42** may be arranged side by side offset in the Y direction.

The first radiation conductor 41 and the second radiation conductor 42 are arranged side by side at an interval that is equal to or shorter than ½ of the resonance wavelength of the antenna 10. In the present embodiment, as illustrated in FIG. 1, the first radiation conductor 41 and the second radiation conductor 42 are arranged side by side with a gap g1 between the long side **41*a* and the long side 42*a* that face each other. The gap g1 is equal to or shorter than ½ of the resonance wavelength of the antenna 10. However, a configuration in which the first radiation conductor 41 and the second radiation conductor 42 are arranged side by side at an interval that is equal to or shorter than ½ of the resonance wavelength of the antenna 10** is not limited to this.

For example, the first radiation conductor 41 and the second radiation conductor 42 may be arranged side by side with a part of the long side **41*a* and a part of the long side 42*a* facing each other. In this configuration, a gap between the part of the long side 41*a* and the part of the long side 42*a* may be equal to or shorter than ½ of the resonance wavelength of the antenna 10**.

Current flows in the first radiation conductor 41 along the Y direction. When the current flows in the first radiation conductor 41 along the Y direction, the magnetic field surrounding the first radiation conductor 41 changes in the XZ plane. Current flows in the second radiation conductor 42 along the Y direction. When the current flows in the second radiation conductor 42 along the Y direction, the magnetic field surrounding the second radiation conductor 42 changes in the XZ plane. The magnetic field surrounding the first radiation conductor 41 and the magnetic field surrounding the second radiation conductor 42 affect each other. For example, when the first radiation conductor 41 and the second radiation conductor 42 are excited in the same phase or phases that are close to each other, the currents flowing in each of the first radiation conductor 41 and the second radiation conductor 42 are mainly oriented in the same direction. The phases that are close to each other include phases within a range of ±60°, ±45°, or ±30°, for example. The current flowing in the first radiation conductor 41 and the current flowing in the second radiation conductor 42 being mainly oriented in the same direction results in strong magnetic field coupling between the first radiation conductor 41 and the second radiation conductor 42.

When the resonance frequencies of the first radiation conductor 41 and the second radiation conductor 42 are the same or close to each other, resonance results in coupling between the first radiation conductor 41 and the second radiation conductor 42. This coupling as a result of the resonance is referred to as an even mode and an odd mode. The even mode and the odd mode are also collectively referred to as an “even-odd mode”. An even-odd mode between the first radiation conductor 41 and the second radiation conductor 42 results in the first radiation conductor 41 and the second radiation conductor 42 resonating at a resonance frequency different from that in a case without the coupling. In many cases, coupling between the first radiation conductor 41 and the second radiation conductor 42 involves magnetic field coupling and electric field coupling concurrently occurring. When one of the magnetic field coupling and the electric field coupling is dominant, the coupling between the first radiation conductor 41 and the second radiation conductor may ultimately be regarded as the dominant one of the magnetic field coupling and the electric field coupling.

In the present disclosure, the second radiation conductor 42 is coupled to the first radiation conductor 41 under a first coupling mode with one of capacitive coupling and the magnetic field coupling being dominant. In the present embodiment, the first radiation conductor 41 and the second radiation conductor 42 are microstrip type antennas, and the long side 41*a* and the long side 42*a* face each other. Interaction between the magnetic field surrounding the first radiation conductor 41 and the magnetic field surrounding the second radiation conductor 42 is dominant over the electric field-based interaction between the first radiation conductor 41 and the second radiation conductor 42. Thus, the coupling between the first radiation conductor 41 and the second radiation conductor 42 is regarded as the magnetic field coupling. Thus, in the present embodiment, the second radiation conductor 42 is coupled to the first radiation conductor 41 under the first coupling mode with the magnetic field coupling being dominant. In the present embodiment, even when the first radiation conductor 41 and the second radiation conductor 42 are coupled under the first coupling mode with the magnetic field coupling being dominant, the first coupling body 71 described below may reduce the probability of occurrence of the even mode and the odd mode.

As illustrated in FIG. 4, the first feed line 51 is electrically connected to the first radiation conductor 41. The first feed line 51 is coupled to the first radiation conductor 41 with an inductance component being dominant. Alternatively, the first feed line 51 may be magnetically coupled to the first radiation conductor 41. In this case, the first feed line 51 is coupled to the first radiation conductor 41 with a capacitance component being dominant.

A part of the first feed line 51 may be located in the base 20. The first feed line 51 is provided through the third coupling body 73. As illustrated in FIG. 2, the first feed line 51 may extend from an opening 61*a* of the first ground conductor 61 to an external device or the like. Through the first feed line 51, power is supplied to the first radiation conductor 41. Through the first feed line 51, power from the first radiation conductor 41 is supplied to an external device or the like. The first feed line 51 may be, for example, a through hole conductor or a via conductor.

As illustrated in FIG. 4, the second feed line 52 is electrically connected to the second radiation conductor 42. The second feed line 52 is coupled to the second radiation conductor 42 with an inductance component being dominant.

Alternatively, the second feed line 52 may be magnetically coupled to the second radiation conductor 42. In this case, the second feed line 52 is coupled to the second radiation conductor 42 with a capacitance component being dominant.

A part of the second feed line 52 may be located in the base 20. The second feed line 52 is provided through the third coupling body 73. As illustrated in FIG. 2, the second feed line 52 may extend from an opening 62*a* of the second ground conductor 62 to an external device or the like. Through the second feed line 52, power is supplied to the second radiation conductor 42.

Through the second feed line 52, power from the second radiation conductor 42 is supplied to an external device or the like. The second feed line 52 may be, for example, a through hole conductor or a via conductor.

As illustrated in FIG. 4, the first feed line 51 extends along the Z direction in the base 20. Current flows in the first feed line 51 along the Z direction. When the current flows in the first feed line 51 along the Z direction, the magnetic field surrounding the first feed line 51 changes in the XY plane.

As illustrated in FIG. 4, the second feed line 52 extends along the Z direction in the base 20. Current flows in the second feed line 52 along the Z direction. When the current flows in the second feed line 52 along the Z direction, the magnetic field surrounding the second feed line 52 changes in the XY plane.

The magnetic field surrounding the first feed line 51 and the magnetic field surrounding the second feed line 52 may interfere with each other. For example, when the currents flowing in each of the first feed line 51 and the second feed line 52 are mainly orientated in the same direction, the magnetic field surrounding the first feed line 51 and the magnetic field surrounding the second feed line 52 interfere with each other. The interference between the magnetic field surrounding the first feed line 51 and the magnetic field surrounding the second feed line 52 may result in magnetic field coupling between the first feed line 51 and the second feed line 52.

In the present disclosure, the second feed line 52 is coupled to the first feed line 51 with any one of the capacitance component and the inductance component being dominant. As described above, in the present embodiment, the interference between the magnetic field surrounding the first feed line 51 and the magnetic field surrounding the second feed line 52 may result in magnetic field coupling between the first feed line 51 and the second feed line 52. In the present embodiment, the second feed line 52 is coupled to the first feed line 51 with the inductance component being dominant.

The first ground conductor 61 provides a reference potential in the first antenna element 31. The second ground conductor 62 provides a reference potential in the second antenna element 32. Each of the first ground conductor 61 and the second ground conductor 62 may be connected to the ground of a device including the antenna 10.

The first ground conductor 61 and the second ground conductor 62 may have a flat plate shape. The first ground conductor 61 and the second ground conductor 62 are located on the lower surface 22 of the base 20. A part of the first ground conductor 61 and a part of the second ground conductor 62 may be located in the base 20.

The first ground conductor 61 may be connected to the second ground conductor 62. As illustrated in FIG. 2, the first ground conductor 61 and the second ground conductor 62 may be integral with each other. The first ground conductor 61 and the second ground conductor 62 may be integral with a single base 20. Alternatively, the first ground conductor 61 and the second ground conductor 62 may be independent separate members. In such a configuration, each of the first ground conductor 61 and the second ground conductor 62 may be independently integral with the base 20.

As illustrated in FIG. 2, the first ground conductor 61 and the second ground conductor 62 extend along the XY plane. The first ground conductor 61 and the second ground conductor 62 are respectively positioned away from the first radiation conductor 41 and the second radiation conductor 42 in the Z direction. As illustrated in FIG. 4, the base 20 is interposed between the first ground conductor 61 and the second ground conductor 62 as well as between the first radiation conductor 41 and the second radiation conductor 42. The first ground conductor 61 faces the first radiation conductor 41 in the Z direction. The second ground conductor 62 faces the second radiation conductor 42 in the Z direction. In the present embodiment, the first ground conductor 61 and the second ground conductor 62 each have a rectangular shape corresponding to the first radiation conductor 41 and the second radiation conductor 42, respectively. Alternatively, the first ground conductor 61 and the second ground conductor 62 may each have any shape corresponding to the first radiation conductor 41 and the second radiation conductor 42, respectively.

In the present disclosure, the first coupling body 71 couples the first end portion 41A of the first radiation conductor 41 and the first end portion 42A of the second radiation conductor 42 to each other under a second coupling mode different from the first coupling mode. As discussed above, in the present embodiment, the first coupling mode is a coupling mode in which the magnetic field coupling is dominant. In view of this, in the present embodiment, the first coupling body 71 couples the first end portion 41A of the first radiation conductor 41 and the first end portion 42A of the second radiation conductor 42 to each other under the second coupling mode in which the capacitive coupling is dominant.

Specifically, the first coupling body 71 is located in the base 20, as illustrated in FIG. 5. The first coupling body 71 is positioned away from the first radiation conductor 41 and the second radiation conductor 42 in the Z direction. The first coupling body 71 extends along the XY plane, as illustrated in FIG. 2. As illustrated in FIG. 5, in the XY plane, the first coupling body 71 may overlap with the first end portion 41A of the first radiation conductor 41 and the first end portion 42A of the second radiation conductor 42. The first coupling body 71, the first end portion 41A and the first end portion 42A overlapping with the first coupling body 71, and the base 20 located therebetween may form a capacitor C1. With the capacitor C1 thus formed, the first coupling body 71 couples the first end portion 41A and the first end portion 42A to each other under the second coupling mode in which the capacitive coupling is dominant. Hereinafter, the capacitance value of the capacitor C1 is described as a capacitance value [C+ΔC].

In the present disclosure, the second coupling body 72 couples the second end portion 41B of the first radiation conductor 41 and the second end portion 42B of the second radiation conductor 42 to each other under the second coupling mode. In the present embodiment, the second coupling body 72 couples the second end portion 41B of the first radiation conductor 41 and the second end portion 42B of the second radiation conductor 42 to each other under the second coupling mode in which the capacitive coupling is dominant.

Specifically, the second coupling body 72 is located in the base 20, as illustrated in FIG. 6. The second coupling body 72 is positioned away from the first radiation conductor 41 and the second radiation conductor 42 in the Z direction. The second coupling body 72 extends along the XY plane, as illustrated in FIG. 2. The area of the second coupling body 72 is smaller than the area of the first coupling body 71. As illustrated in FIG. 6, in the XY plane, the second coupling body 72 may overlap with the second end portion 41B of the first radiation conductor 41 and the second end portion 42B of the second radiation conductor 42. The second coupling body 72, the second end portion 41B and the second end portion 42B overlapping with the second coupling body 72, and the base 20 located therebetween may form a capacitor C2. With the capacitor C2 thus formed, the second coupling body 72 couples the second end portion 41B and the second end portion 42B to each other under the second coupling mode in which the capacitive coupling is dominant. Hereinafter, the capacitance value of the capacitor C2 is described as a capacitance value [ΔC].

The capacitance value [C], of the capacitance value [C+ΔC] of the capacitor C1, may be appropriately selected in accordance with a coupling coefficient K based on the capacitive coupling and the magnetic field coupling between the first radiation conductor 41 and the second radiation conductor 42.

The coupling coefficient K may be calculated using a coupling coefficient Ke and a coupling coefficient Km. For example, the coupling coefficient K can be expressed by the following formula: $K=(Ke^2-Km^2)/(Ke^2-Km^2)$.

The coupling coefficient Km is the coupling coefficient of the magnetic field coupling between the first radiation conductor 41 and the second radiation conductor 42. As described above, the second radiation conductor 42 is coupled to the first radiation conductor 41 under the first coupling mode in which the magnetic field coupling is dominant. The coupling coefficient Km is the coupling coefficient of the magnetic field coupling according to this first coupling mode. The coupling coefficient Km may be determined based on the configurations of the first radiation conductor 41 and the second radiation conductor 42. For example, the coupling coefficient Km may vary according to the length of the gap g1 in the X direction illustrated in FIG. 1.

The coupling coefficient Ke is the coupling coefficient of the capacitive coupling between the first radiation conductor 41 and the second radiation conductor 42. As described above, the first coupling body 71 couples the first end portion 41A and the first end portion 42A to each other under the second coupling mode in which the capacitive coupling is dominant. Thus, the coupling coefficient Ke is the coupling coefficient of the capacitive coupling according to this second coupling mode.

In the antenna 10, the magnitude of the coupling coefficient Ke can be adjusted by appropriately configuring the first coupling body 71. Specifically, by appropriately adjusting the capacitance value [C], of the capacitance value [C+ΔC] of the capacitor C1, the magnitude of the coupling coefficient Ke can be adjusted according to the coupling coefficient Km. Note that when the antenna 10 is in the resonant state, the phase of the first end portion 41A of the first radiation conductor 41 as well as the phase of the first end portion 42A of the second radiation conductor 42, and the phase of the second end portion 41B of the first radiation conductor 41 as well as the second end portion 42B of the second radiation conductor 42 are in an inverted state. Therefore, in the coupling coefficient Ke, the capacitance value [ΔC], of the capacitance value [C+ΔC] of the capacitor C1, is canceled out by the capacitance value [ΔC] of the capacitor C2. In the antenna 10, the level of cancellation between the coupling coefficient Km and the coupling coefficient Ke can be changed by adjusting the capacitance value [C], of the capacitance value [C+ΔC] of the capacitor C1, in accordance with the coupling coefficient Km and thereby adjusting the magnitude of the coupling coefficient Ke. In the antenna 10, the coupling coefficient K may be reduced through the cancellation between the coupling coefficient Km and the coupling coefficient Ke. In other words, in the antenna 10, the mutual coupling between the first radiation conductor 41 and the second radiation conductor 42, that is, the mutual coupling between the first antenna element 31 and the second antenna element 32 may be reduced. With the mutual coupling between the first radiation conductor 41 and the second radiation conductor 42 reduced, each of the first antenna element 31 and the second antenna element 32 can efficiently radiate electromagnetic waves from the first radiation conductor 41 and the second radiation conductor 42, respectively.

A capacitance value [2×ΔC] that is the sum of the capacitance value [ΔC], of the capacitance value [C+ΔC] of the capacitor C1, and the capacitance value [ΔC] of the capacitor C2 may be appropriately selected based on an attenuation pole of an anti-resonance circuit formed by the first radiation conductor 41, the second radiation conductor 42, and the first coupling body 71. The inductance component of the magnetic field coupling between the first radiation conductor 41 and the second radiation conductor 42 and the capacitance component of the first coupling body 71, that is, the capacitor C1 are in a circuit-parallel relationship. The inductance component and the capacitance component being in a parallel relationship forms an anti-resonance circuit including the inductance component and the capacitance component. This anti-resonance circuit causes an attenuation pole to occur in transmission characteristics between the first antenna element 31 and the second antenna element 32. These transmission characteristics are characteristics of power transmission from the first radiation conductor 41 to the second radiation conductor 42 (or from the second radiation conductor 42 to the first radiation conductor 41). At the frequency at which the attenuation pole of the anti-resonance circuit occurs, the power transmitted from the first radiation conductor 41 to the second radiation conductor 42 (or from the second radiation conductor 42 to the first radiation conductor 41) may be attenuated. Thus, at the frequency at which the attenuation pole of the anti-resonance circuit occurs, interference between the first radiation conductor 41 and the second radiation conductor 42 is small. The capacitance value [2×ΔC] may be adjusted to make the frequency at which the attenuation pole occurs close to at least one of the first frequency band and the second frequency band. For example, in a configuration in which the first frequency band and the second frequency band belong to the same frequency band, the capacitance value [2×ΔC] may be adjusted such that the frequency at which the attenuation pole occurs is included in the first frequency band. When the frequency at which the attenuation pole occurs is included in the first frequency band, the power transmitted from the first radiation conductor 41 to the second radiation conductor 42 (or from the second radiation conductor 42 to the first radiation conductor 41) can be attenuated in the first frequency band (or in the second frequency band). As another example, in a configuration in which the first frequency band and the second frequency band belong to different frequency bands, the capacitance value [2×ΔC] may be adjusted such that the frequency at which the attenuation pole occurs is included in a frequency band between the first frequency band and the second frequency band. With such a configuration, in the first frequency band (or the second frequency band), each of the first antenna element 31 and the second antenna element 32 can efficiently radiate electromagnetic waves from the first radiation conductor 41 and the second radiation conductor 42, respectively.

The third coupling body 73 directly short-circuits and alternately opens the first feed line 51 and the second feed line 52. For example, the impedance of the third coupling body 73 becomes low enough for the first feed line 51 and the second feed line 52 to be regarded as being short-circuited in a frequency band lower than the first frequency band and the second frequency band. For example, the impedance of the third coupling body 73 becomes high enough for the first feed line 51 and the second feed line 52 to be regarded as being open in the first frequency band and the second frequency band. Thus, the impedance of the third coupling body 73 varies depending on the frequency of the alternating current flowing in the first feed line 51 and the second feed line 52. The impedance of the third coupling body 73 may be appropriately adjusted by appropriately adjusting the area, width, and length of the third coupling body 73. The first feed line 51 and the second feed line 52 may pass through the third coupling body 73.

In the antenna 10, as described above, the coupling between the first feed line 51 and the second feed line 52 is coupling in which the inductance component is dominant. The first feed line 51, the second feed line 52, and components in the vicinity of the first feed line 51 and the second feed line 52, including the third coupling body 73, form the anti-resonance circuit. This anti-resonance circuit causes an attenuation pole to occur in transmission characteristics between the first antenna element 31 and the second antenna element 32. These transmission characteristics are characteristics of power transmission from the first feed line 51 serving as an input port of the first antenna element 31 to the second feed line 52 serving as an input port of the second antenna element 32. At the frequency at which the attenuation pole of this anti-resonance circuit occurs, power transmitted from the first feed line 51 to the second feed line 52 (or from the second feed line 52 to the first feed line 51) can be attenuated. Thus, at the frequency at which the attenuation pole of the anti-resonance circuit occurs, interference between the first antenna element 31 and the second antenna element 32 is small. In the present embodiment, the attenuation pole of the anti-resonance circuit can be adjusted by adjusting the impedance of the third coupling body 73. For example, for example, the impedance of the third coupling body 73 can be adjusted by adjusting the length of the third coupling body 73 in the X direction. As an example, in a configuration in which the first frequency band and the second frequency band belong to the same frequency band, the impedance of the third coupling body 73 may be adjusted such that the frequency at which the attenuation pole occurs is included in the first frequency band. As another example, in a configuration in which the first frequency band and the second frequency band belong to different frequency bands, the impedance of the third coupling body 73 may be adjusted such that the frequency at which the attenuation pole occurs is included in a frequency band between the first frequency band and the second frequency band. With such a configuration, in the first frequency band (or the second frequency band), each of the first antenna element 31 and the second antenna element 32 can efficiently radiate electromagnetic waves.

Simulation Results

Figure 7:
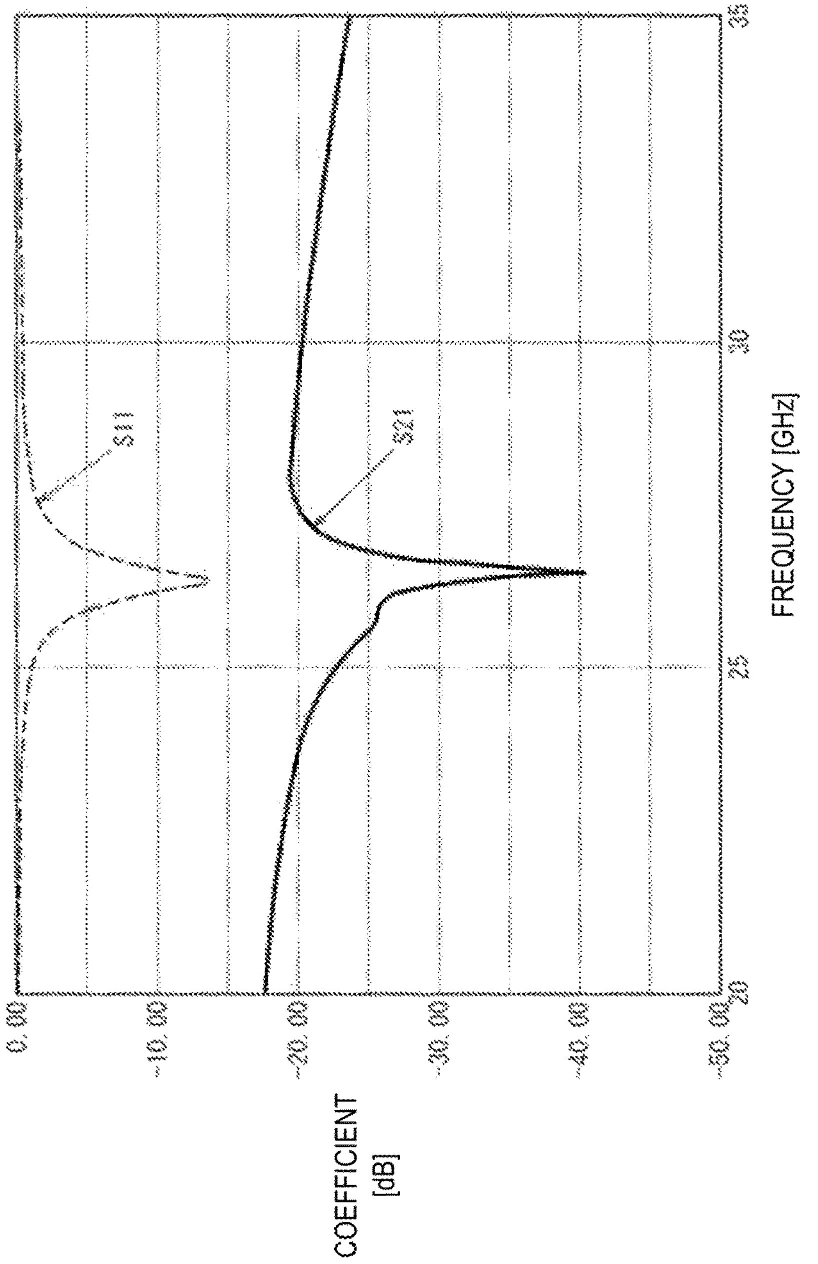
FIG. 7 is a graph showing an example of simulation results of the antenna illustrated in FIG. 1.

FIG. 7 is a graph showing an example of simulation results of the antenna 10 illustrated in FIG. 1. The dashed line indicates a reflection coefficient S11. The solid line indicates a transmission coefficient S21. In FIG. 7, a range from a frequency of 25 [GHz] to a frequency of 30 [GHz] is defined as a target frequency band.

The reflection coefficient S11 indicates the percentage of power, of the power supplied from the first feed line 51 to the first radiation conductor 41, reflected by the first radiation conductor 41 and returning to the first feed line 51. In the present embodiment, as will be described in greater detail below, due to the reduction in the mutual coupling between the first radiation conductor 41 and the second radiation conductor 42, the reflection coefficient S11 may have a single minimum value. A minimum value of the reflection coefficient S11 of approximately −11 [dB] is obtained at a frequency around 28 [GHz].

The transmission coefficient S21 indicates the percentage of power, of the power supplied to the first feed line 51, transmitted to the second feed line 52. In a simulation, the frequency of the attenuation pole of the anti-resonance circuit formed by the first feed line 51 and the second feed line 52 is adjusted by the third coupling body 73 to be around a frequency of 28 [GHz]. Therefore, the transmission coefficient S21 has a minimum value at 28 [GHz]. In addition, the maximum value of the transmission coefficient S21 is approximately −20 [dB] at a frequency around 30 [GHz].

Antenna According to Comparative Example

Figure 8:
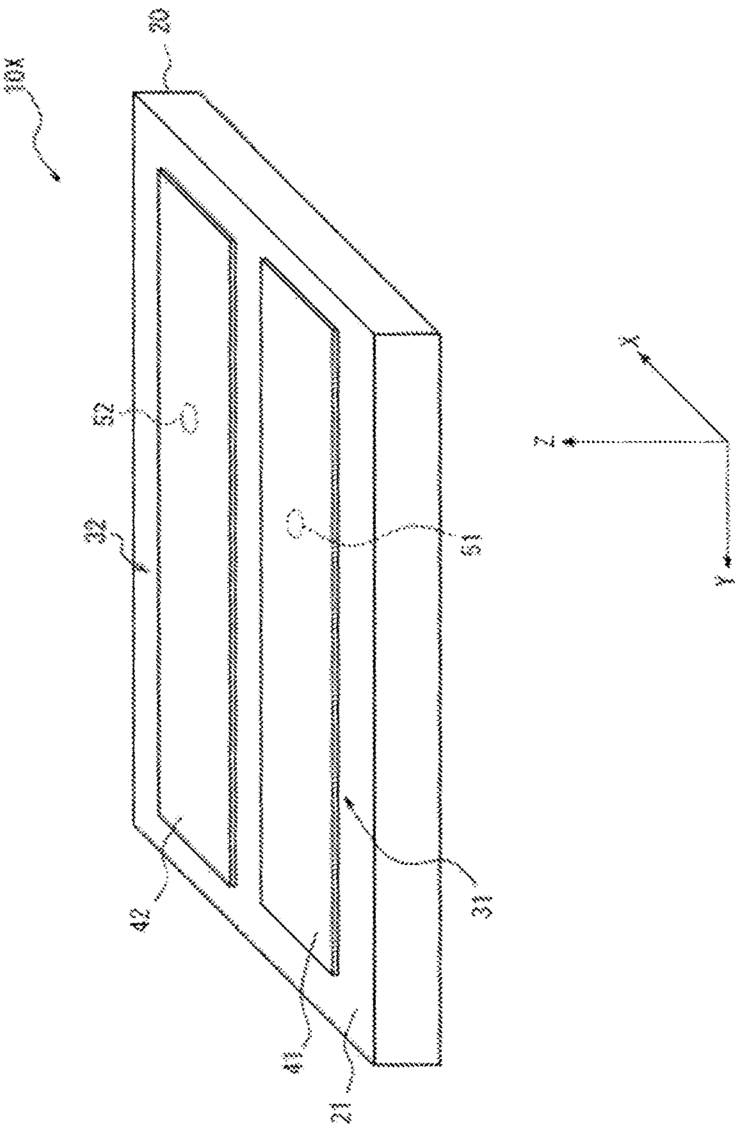
FIG. 8 is a perspective view of an antenna according to a comparative example.

FIG. 8 is a perspective view of an antenna 10X according to a comparative example. Unlike the antenna 10 illustrated in FIG. 1, the antenna 10X does not include the first coupling body 71, the second coupling body 72, or the third coupling body 73.

The coupling coefficient based on the capacitive coupling and the magnetic field coupling between the first radiation conductor 41 and the second radiation conductor 42 according to the comparative example is defined as a coupling coefficient Kx. The coupling coefficient of the capacitive coupling between the first radiation conductor 41 and the second radiation conductor 42 is defined as a coupling coefficient Kex. The coupling coefficient of the magnetic field coupling between the first radiation conductor 41 and the second radiation conductor 42 is defined as a coupling coefficient Kmx. The coupling coefficient Kx of the comparative example may be calculated using the coupling coefficient Kex and the coupling coefficient Kmx as in the present embodiment. For example, the coupling coefficient Kx is expressed by the following formula: $Kx^2=(Kex^2-Kmx^2)/(Kex^2+Kmx^2)$.

The antenna 10X according to the comparative example does not include the first coupling body 71. In the antenna 10X according to the comparative example, the level of cancellation between the coupling coefficient Kmx and the coupling coefficient Kex cannot be adjusted. In the antenna 10X according to the comparative example, the level of cancellation between the coupling coefficient Kmx and the coupling coefficient Kex cannot be adjusted, and thus the coupling coefficient Kx cannot be adjusted. In contrast, the antenna 10 includes the first coupling body 71, and thus the capacitance value [C] of the capacitance value [C+ΔC] of the capacitor C1 can be adjusted, whereby the coupling coefficient K can be adjusted to be smaller. In other words, in the antenna 10X according to the comparative example, the mutual coupling between the first radiation conductor 41 and the second radiation conductor 42 may be larger than that in the antenna 10.

In general, resonators with the same resonance frequency are coupled when brought close to each other. In the antenna 10X according to the comparative example, the mutual coupling between the first radiation conductor 41 and the second radiation conductor 42 is large, resulting in the even-odd mode. The antenna 10X according to the comparative example resonates at a resonance frequency differing between the even mode and the odd mode. The antenna 10X according to the comparative example resonates under the even-odd mode at different resonance frequencies, and thus the electromagnetic wave radiation efficiency may be compromised.

The antenna 10X according to the comparative example does not include the first coupling body 71 or the second coupling body 72. In the antenna 10X according to the comparative example, the attenuation pole of the anti-resonance circuit formed by the first radiation conductor 41, the second radiation conductor 42, the first coupling body 71, and the second coupling body 72 cannot be adjusted by adjusting the capacitance value [2×ΔC] of the capacitor C1 and the capacitor C2 as in the present embodiment. Because the attenuation pole of the anti-resonance circuit cannot be adjusted, the radiation efficiency of electromagnetic waves of the antenna 10X according to the comparative example may be lower than the radiation efficiency of electromagnetic waves of the antenna 10 according to the present embodiment.

The antenna 10 according to the comparative example does not include the third coupling body 73. In the antenna 10X according to the comparative example, the attenuation pole of the anti-resonance circuit formed by the first feed line 51, the second feed line 52, and other components cannot be adjusted as in the present embodiment. Because the attenuation pole of the anti-resonance circuit cannot be adjusted, the radiation efficiency of electromagnetic waves of the antenna 10X according to the comparative example may be lower than the radiation efficiency of electromagnetic waves of the antenna 10 according to the present embodiment.

Simulation Results

Figure 9:
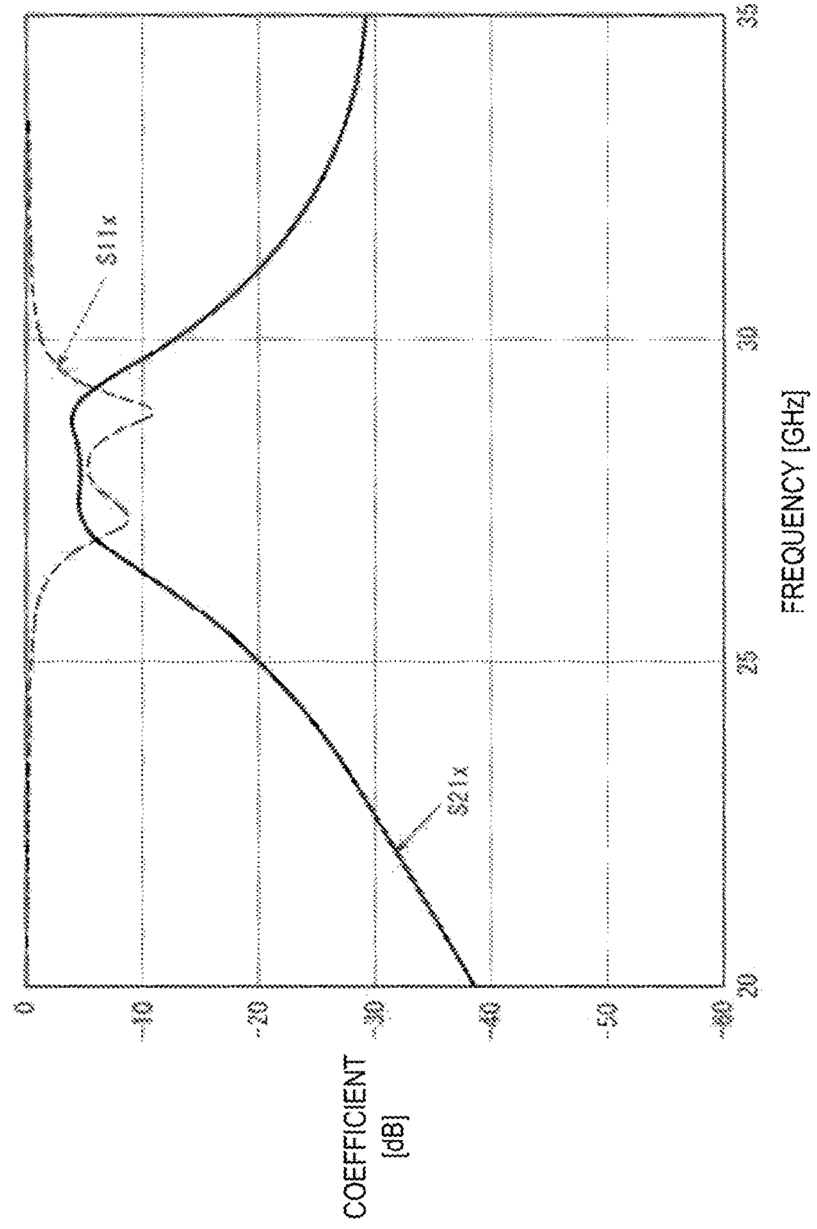
FIG. 9 is a graph showing an example of simulation results of the antenna according to the comparative example.

FIG. 9 is a graph showing an example of simulation results for the antenna 10X according to the comparative example. In other words, FIG. 9 is a diagram illustrating an example of simulation results of the antenna 10X illustrated in FIG. 8. In FIG. 9, a range from a frequency of 25 [GHz] to a frequency of 30 [GHz] is defined as a target frequency band as in FIG. 7.

The dashed line indicates a reflection coefficient S11*x* of the antenna 10X according to the comparative example. The solid line indicates a transmission coefficient S21*x* of the antenna 10X according to the comparative example.

A minimum value of the reflection coefficient S11*x* of approximately −9 [dB] is obtained at a frequency around 27 [GHz]. A minimum value of the reflection coefficient S11*x* of approximately −10 [dB] is obtained at a frequency around 29 [GHz]. Thus, in the comparative example, the reflection coefficient S11*x* has two minimum values.

The reflection coefficient S11*x* having two minimum values means that the antenna 10X has two resonance frequencies. The two resonances of the antenna 10X occur due to the even mode and the odd mode. The antenna 10X resonating under the even-odd mode indicates that the mutual coupling between the first antenna element 31 and the second antenna element 32 is large. Since the first antenna element 31 and the second antenna element 32 resonate under the even-odd mode, the efficiency of the radiation of electromagnetic waves is compromised owing to the first radiation conductor 41 and the second radiation conductor 42, respectively.

The maximum value of the transmission coefficient 521*x* is approximately −5 [dB] within a frequency range from 27 [GHz] to 29 [GHz]. The maximum value of the transmission coefficient 521*x* is larger than the transmission coefficient S21 of the present embodiment illustrated in FIG. 7. The transmission coefficient 521*x* being large indicates that a large proportion of power is transmitted from the first feed line 51 to the second feed line 52.

Unlike the comparative example, the antenna 10 includes the first coupling body 71 that forms the capacitor C1, as illustrated in FIG. 5. In the present embodiment, the mutual coupling between the first radiation conductor 41 and the second radiation conductor 42 can be reduced by adjusting the capacitance value [C] of the capacitance value [C+ΔC] of the capacitor C1. With the mutual coupling between the first radiation conductor 41 and the second radiation conductor 42 reduced, the efficiency of radiation of electromagnetic waves from each of the first radiation conductor 41 and the second radiation conductor 42 can be improved. Furthermore, with the mutual coupling between the first radiation conductor 41 and the second radiation conductor 42 reduced, a change in the resonance frequency due to the antenna 10 resonating under the even-odd mode can be suppressed.

The antenna 10 according to the present embodiment includes the second coupling body 72 forming the capacitor C2, in addition to the first coupling body 71 forming the capacitor C1, as illustrated in FIG. 6. In the present embodiment, the attenuation pole of the anti-resonance circuit formed by the first radiation conductor 41, the second radiation conductor 42, the first coupling body 71, and the second coupling body 72 can be adjusted by adjusting the capacitance value [2×ΔC] of the capacitor C1 and the capacitor C2. By adjusting the attenuation pole of the anti-resonance circuit, the radiation efficiency of electromagnetic waves of the antenna 10 can be improved.

As illustrated in FIG. 4, the antenna 10 according to the present embodiment includes the third coupling body 73. In the antenna 10, the attenuation pole of the anti-resonance circuit provided by the first feed line 51 and the second feed line 52 can be adjusted by the third coupling body 73. By adjusting the attenuation pole of the anti-resonance circuit, the radiation efficiency of electromagnetic waves of the antenna 10 can be improved.

In the antenna 10 according to the present embodiment, the first coupling body 71, the second coupling body 72, and the third coupling body 73 are components that are independent of each other. In the present embodiment, by using components that are independent of each other, mutual coupling between the first radiation conductor 41 and the second radiation conductor 42 can be reduced and the attenuation pole of the anti-resonance circuit can be adjusted as described above. In the present embodiment, using such components that are independent of each other affords a greater degree of freedom in designing for adjustment of the mutual coupling between the first radiation conductor 41 and the second radiation conductor 42 and the like may be increased.

Configuration Example of Array Antenna

Figure 10:
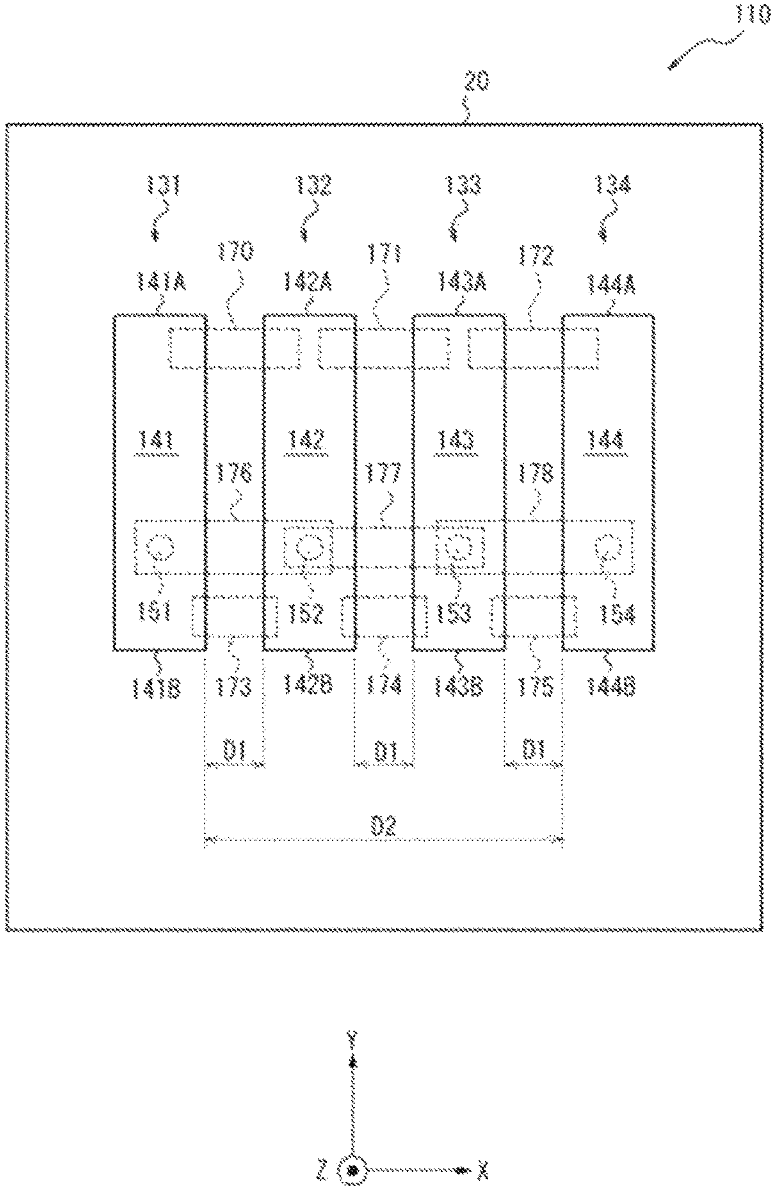
FIG. 10 is a plan view of an antenna according to an embodiment of the present disclosure.

FIG. 10 is a plan view of an antenna 110 according to an embodiment of the present disclosure. The antenna 110 may be an array antenna. The antenna 110 may be a linear array antenna.

The antenna 110 includes the base 20 and n antenna elements (where n is an integer that is equal to or larger than 3) as a plurality of antenna elements. In the present embodiment, the antenna 110 has four antenna elements (n=4), that is, antenna elements 131, 132, 133, and 134. The antenna 110 includes first coupling bodies 170, 171, and 172, second coupling bodies 173, 174, and 175, and third coupling bodies 176, 177, and 178.

Each of the antenna elements 131 to 134 may have the same configuration as the first antenna element 31 or the second antenna element 32 illustrated in FIG. 1. The antenna elements 131, 132, 133, and 134 respectively include radiation conductors 141, 142, 143, and 144 and feed lines 151, 152, 153, and 154. Each of the radiation conductors 141 to 144 may have the same configuration as the first radiation conductor 41 or the second radiation conductor 42 illustrated in FIG. 1. Each of the feed lines 151 to 154 may have the same configuration as the first feed line 51 or the second feed line 52 illustrated in FIG. 1. Each of the antenna elements 131 to 134 may include the first ground conductor 61 or the second ground conductor 62 illustrated in FIG. 2.

Each of the antenna elements 131 to 134 resonates in the first frequency band or the second frequency band depending on the application of the antenna 110 or other factors. The antenna elements 131 to 134 are arranged side by side along the X direction. The antenna elements 131 to 134 may be arranged side by side in the X direction at an interval that is equal to or shorter than ¼ of the resonance wavelength of the antenna 110. In the present embodiment, the radiation conductors 141 to 144 may be arranged side by side along the X direction at an interval D1. The interval D1 is equal to or shorter than ¼ of the resonance wavelength of the antenna 110.

In a configuration in which the antenna element 134 as an n-th antenna element resonates in the first frequency band, the radiation conductor 144 as an n-th radiation conductor is disposed separated from the radiation conductor 141 as the first radiation conductor by an interval D2 in the X direction. The interval D2 is equal to or shorter than ½ of the resonance wavelength of the antenna 110. Furthermore, the radiation conductor 144 as the n-th radiation conductor may be directly or indirectly coupled to the radiation conductor 142 as the second radiation conductor.

The antenna elements 131 to 134 may be supplied with signals that cause excitation of the antenna elements 131 to 134 in the same phase, from the respective feed lines 151 to 154. Alternatively, the antenna elements 131 to 134 may be supplied with signals that cause excitation of the antenna elements 131 to 134 in different phases, from the respective feed lines 151 to 154.

The radiation conductor 141 and the radiation conductor 142 adjacent to each other are coupled to each other under the first coupling mode in which magnetic field coupling is dominant. The radiation conductor 142 and the radiation conductor 143 adjacent to each other are coupled to each other under the first coupling mode in which magnetic field coupling is dominant. The radiation conductor 143 and the radiation conductor 144 adjacent to each other are coupled to each other under the first coupling mode in which magnetic field coupling is dominant.

The first coupling body 170 couples an end portion 141A of the radiation conductor 141 and an end portion 142A of the radiation conductor 142, which are adjacent to each other, under the second coupling mode in which capacitive coupling is dominant, as in the case of the first coupling body 71 illustrated in FIG. 1. The first coupling body 171 couples the end portion 142A of the radiation conductor 142 and an end portion 143A of the radiation conductor 143, which are adjacent to each other, under the second coupling mode in which capacitive coupling is dominant. The first coupling body 172 couples the end portion 143A of the radiation conductor 143 and an end portion 144A of the radiation conductor 144, which are adjacent to each other, under the second coupling mode in which capacitive coupling is dominant.

The second coupling body 173 couples an end portion 141B of the radiation conductor 141 and an end portion 142B of the radiation conductor 142, which are adjacent to each other, under the second coupling mode in which capacitive coupling is dominant, as in the case of the second coupling body 72 illustrated in FIG. 1. The second coupling body 174 couples the end portion 142B of the radiation conductor 142 and an end portion 143B of the radiation conductor 143, which are adjacent to each other, under the second coupling mode in which capacitive coupling is dominant. The second coupling body 175 couples the end portion 143B of the radiation conductor 143 and an end portion 144B of the radiation conductor 144, which are adjacent to each other, under the second coupling mode in which capacitive coupling is dominant.

The feed line 151 and the feed line 152 adjacent to each other are coupled to each other with the inductance component, which is one of the capacitance component and the inductance component, being dominant. The feed line 152 and the feed line 153 adjacent to each other are coupled to each other with the inductance component, which is one of the capacitance component and the inductance component, being dominant. The feed line 153 and the feed line 154 adjacent to each other are coupled to each other with the inductance component, which is one of the capacitance component and the inductance component, being dominant.

The third coupling body 176 directly short-circuits and alternately opens the feed lines 151 and 152 adjacent to each other, as in the case of the third coupling body 73 illustrated in FIG. 1. The third coupling body 177 directly short-circuits and alternately opens the feed lines 152 and 153 adjacent to each other. The third coupling body 178 directly short-circuits and alternately opens the feed lines 153 and 154 adjacent to each other.

Configuration Example of Wireless Communication Module

Figure 11:
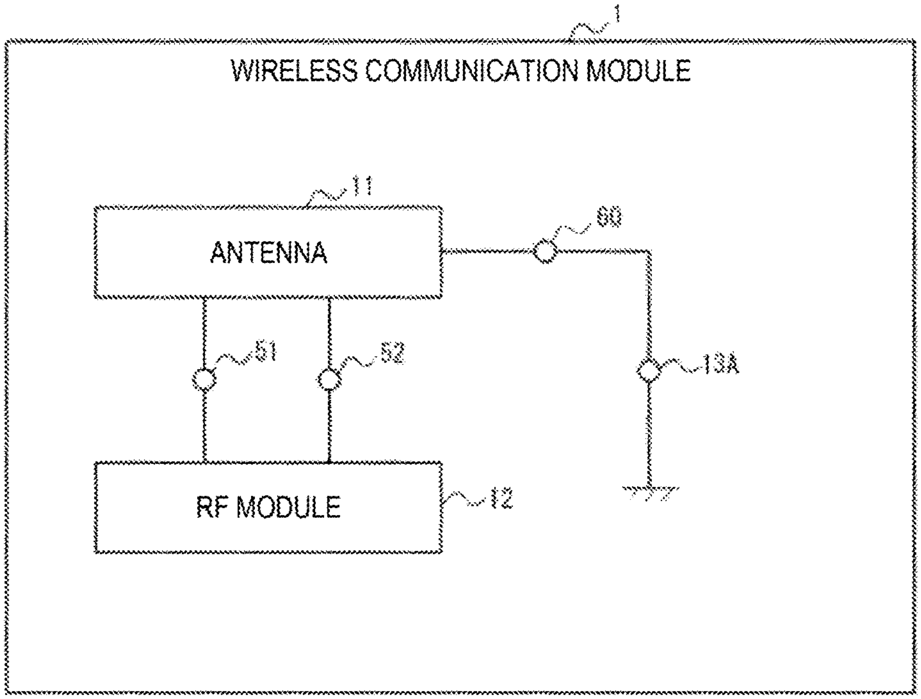
FIG. 11 is a block diagram of a wireless communication module according to an embodiment of the present disclosure.
Figure 12:
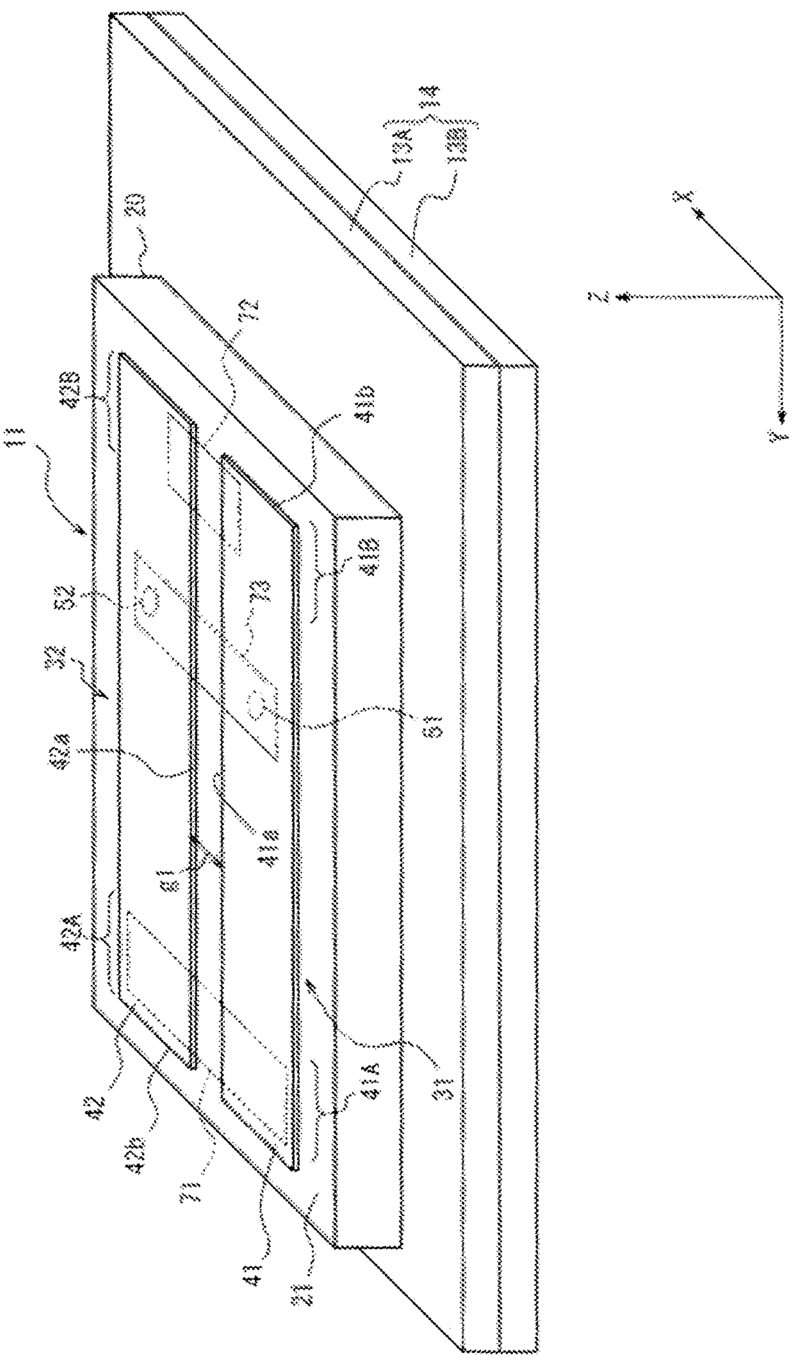
FIG. 12 is a schematic configuration diagram of the wireless communication module illustrated in FIG. 11.

FIG. 11 is a block diagram of a wireless communication module 1 according to an embodiment of the present disclosure. FIG. 12 is a schematic configuration diagram of the wireless communication module 1 illustrated in FIG. 11.

The wireless communication module 1 includes an antenna 11, an RF module 12, and a circuit board 14. The circuit board 14 includes a ground conductor 13A and a printed circuit board 13B.

The antenna 11 includes the antenna 10 illustrated in FIG. 1. Alternatively, instead of the antenna 10 illustrated in FIG. 1, the antenna 11 may include the antenna 110 illustrated in FIG. 10. The antenna 11 includes the first feed line 51 and the second feed line 52. The antenna 11 includes a ground conductor 60. The ground conductor 60 is formed by integrating the first ground conductor 61 and the second ground conductor 62 illustrated in FIG. 2.

The antenna 11 is located above the circuit board 14, as illustrated in FIG. 12. The first feed line 51 of the antenna 11 is connected to the RF module 12 illustrated in FIG. 11 via the circuit board 14 illustrated in FIG. 12. The second feed line 52 of the antenna 11 is connected to the RF module 12 illustrated in FIG. 11 via the circuit board 14 illustrated in FIG. 12. The ground conductor 60 of the antenna 11 is electromagnetically connected to the ground conductor 13A of the circuit board 14.

The antenna 11 is not limited to an antenna that includes both the first feed line 51 and the second feed line 52. The antenna 11 may include one of the first feed line 51 and the second feed line 52. In this configuration, the configuration of the circuit board 14 may be changed as appropriate according to the configuration of the antenna 11 including one feed line. For example, the RF module 12 may have one connection terminal. For example, the circuit board 14 may have one conductive line that connects the connection terminal of the RF module 12 and the feed line of the antenna 11 to each other.

The ground conductor 13A may include a conductive material. The ground conductor 13A may extend in the XY plane.

The antenna 11 may be integral with the circuit board 14. In a configuration in which the antenna 11 and the circuit board 14 are integral with each other, the ground conductor 60 of the antenna 11 may be integral with the ground conductor 13A of the circuit board 14.

The RF module 12 controls power supplied to the antenna 11. The RF module 12 modulates a baseband signal and supplies the resultant signal to the antenna 11. The RF module 12 modulates an electrical signal received by the antenna 11 into the baseband signal.

Such a wireless communication module 1 can efficiently radiate electromagnetic waves due to the antenna 11 provided.

Example of Configuration of Wireless Communication Device

Figure 13:
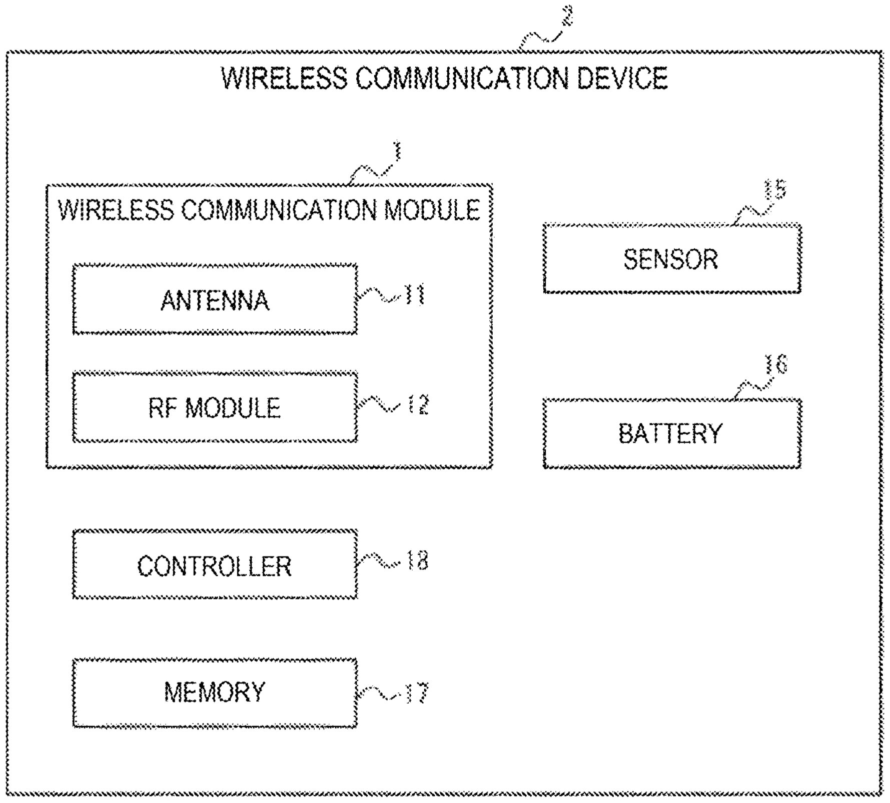
FIG. 13 is a block diagram of a wireless communication device according to an embodiment of the present disclosure.
Figure 14:
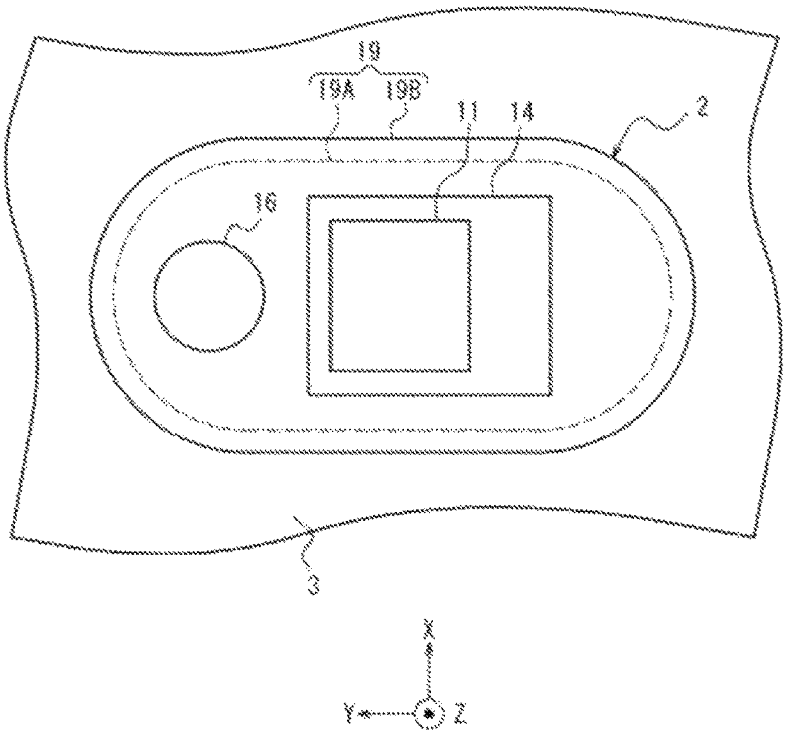
FIG. 14 is a plan view of the wireless communication device illustrated in FIG. 13.
Figure 15:
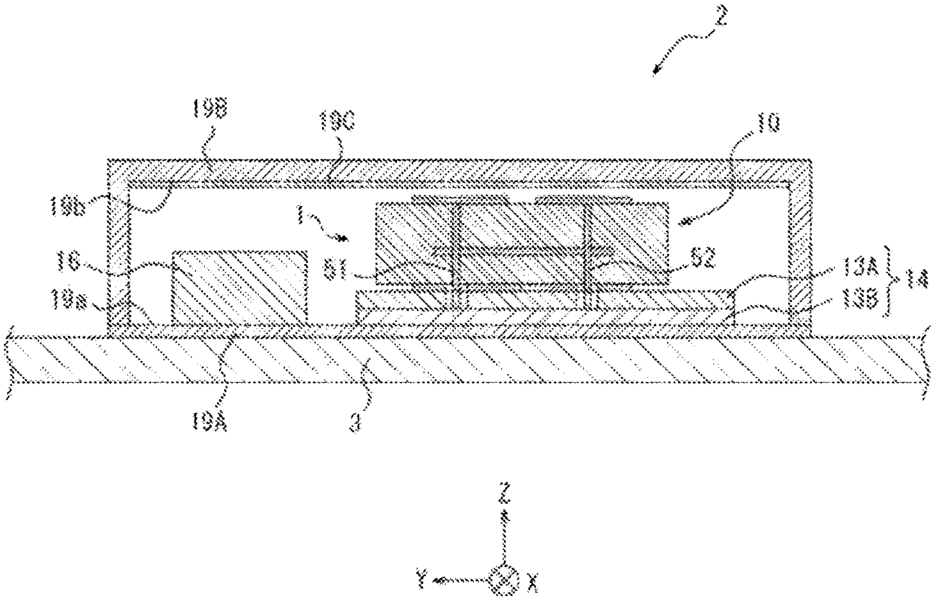
FIG. 15 is a cross-sectional view of the wireless communication device illustrated in FIG. 13.

FIG. 13 is a block diagram of a wireless communication device 2 according to an embodiment of the present disclosure. FIG. 14 is a plan view of the wireless communication device 2 illustrated in FIG. 13. FIG. 15 is a cross-sectional view of the wireless communication device 2 illustrated in FIG. 13.

The wireless communication device 2 can be located on a substrate 3. The material of the substrate 3 may be any material. As illustrated in FIG. 13, the wireless communication device 2 includes the wireless communication module 1, a sensor 15, a battery 16, a memory 17, and a controller 18. The wireless communication device 2 includes a housing 19 as illustrated in FIG. 14.

Examples of the sensor 15 may include a velocity sensor, a vibration sensor, an acceleration sensor, a gyroscopic sensor, a rotation angle sensor, an angular velocity sensor, a geomagnetic sensor, a magnet sensor, a temperature sensor, a humidity sensor, an air pressure sensor, an optical sensor, an illuminance sensor, a UV sensor, a gas sensor, a gas concentration sensor, an atmosphere sensor, a level sensor, an odor sensor, a pressure sensor, a pneumatic sensor, a contact sensor, a wind sensor, an infrared sensor, a motion sensor, a displacement sensor, an image sensor, a weight sensor, a smoke sensor, a leakage sensor, a vital sensor, a battery level sensor, an ultrasound sensor, and a Global Positioning System (GPS) signal receiver.

The battery 16 supplies power to the wireless communication module 1. The battery 16 may supply power to at least one of the sensor 15, the memory 17, and the controller 18. The battery 16 may include at least one of a primary battery and a secondary battery. The negative pole of the battery 16 is electrically connected to the ground terminal of the circuit board 14 illustrated in FIG. 12. The negative pole of the battery 16 is electrically connected to the ground conductor 40 of the antenna 11.

The memory 17 may include, for example, a semiconductor memory. The memory 17 may function as a work memory for the controller 18. The memory 17 may be included in the controller 18. The memory 17 stores programs describing contents of processing for implementing the functions of the wireless communication device 2, information used for processing in the wireless communication device 2, and the like.

The controller 18 may include a processor, for example. The controller 18 may include one or more processors. The processor may include a general purpose processor that reads a specific program to execute a specific function, and a dedicated processor dedicated to specific processing. The dedicated processor may include an application-specific IC. The application-specific IC is also referred to as an Application Specific Integrated Circuit (ASIC). The processor may include a programmable logic device. The programmable logic device is also referred to as a Programmable Logic Device (PLD). The PLD may include a Field-Programmable Gate Array (FPGA). The controller 18 may be any of a System-on-a-Chip (SoC) and a System In a Package (SiP) in which one or a plurality of processors cooperate. The controller 18 may store, in the memory 17, various types of information or programs and the like for causing the components of the wireless communication device 2 to operate.

The controller 18 generates a transmission signal to be transmitted from the wireless communication device 2. The controller 18 may obtain measurement data from the sensor 15, for example. The controller 18 may generate the transmission signal based on the measurement data. The controller 18 may transmit a baseband signal to the RF module 12 of the wireless communication module 1.

As illustrated in FIG. 14 and FIG. 15, the housing 19 protects other devices of the wireless communication device 2. The housing 19 may include a first housing 19A and a second housing 19B.

The first housing 19A may extend in the XY plane. The first housing 19A supports other devices. The first housing 19A may support the wireless communication device 2. The wireless communication device 2 is located on an upper surface 19*a* of the first housing 19A. The first housing 19A may support the battery 16. The battery 16 is located on the upper surface 19*a* of the first housing 19A. On the upper surface 19*a* of the first housing 19A, the wireless communication module 1 and the battery 16 may be arranged side by side along the Y direction.

The second housing 19B may cover other devices. The second housing 19B includes a lower surface 19*b* located on the side of the negative direction on the Z axis of the antenna 11. The lower surface 19*b* extends along the XY plane. The lower surface 19*b* is not limited to a flat surface, and may include recesses and protrusions. The second housing 19B may include a conductive member 19C. The conductive member 19C is located inside, on one of the outer side and/or on the inner side, of the second housing 19B. The conductive member 19C is located on the upper surface and/or on a side surface of the second housing 19B.

As illustrated in FIG. 15, the conductive member 19C faces the antenna 11. The antenna 11 is coupled to the conductive member 19C and can radiate electromagnetic waves by using the conductive member 19C as a secondary radiator. The antenna 11 and the conductive member 19C facing each other may result in a large capacitive coupling between the antenna 11 and the conductive member 19C. When the current direction of the antenna 11 is aligned with the extending direction of the conductive member 19C, a large electromagnetic coupling may occur between the antenna 11 and the conductive member 19C. This coupling may function as mutual inductance.

The configuration according to the present disclosure is not limited to the embodiments described above, and many variations or changes can be made. For example, the functions and other features of each of the components and the like can be repositioned so as to not be logically inconsistent, and a plurality of components or the like can be combined into one or divided.

For example, in the embodiment described above, as illustrated in FIG. 3, the first coupling body 71 and the second coupling body 72 are described as being positioned more on the side of the negative direction on the Z axis than the first radiation conductor 41 and the second radiation conductor 42. However, the first coupling body 71 may not be located on the side of the negative direction on the Z axis, as long as the first end portion 41A of the first radiation conductor 41 and the first end portion 42A of the second radiation conductor 42 can be coupled to each other under the second coupling mode. Furthermore, the second coupling body 72 may not be located on the side of the negative direction on the Z axis, as long as the second end portion 41B of the first radiation conductor 41 and the second end portion 42B of the second radiation conductor 42 can be coupled to each other under the second coupling mode. For example, the first coupling body 71 and the second coupling body 72 may be located more on the side of the positive direction on the Z axis than the first radiation conductor 41 and the second radiation conductor 42.

The drawings used to describe the configuration according to the present disclosure are schematic. The dimensional proportions and the like in the drawings are not necessarily the same as actual proportions and the like.

In the present disclosure, the terms "first", "second", "third", or the like are examples of identifiers for distinguishing corresponding configurations. Configurations distinguished by the term "first", "second", or the like in the present disclosure may take on different numbers in these configurations. For example, the first frequency and the second frequency may have "first" and "second" identifiers, respectively. The exchange of identifiers is performed simultaneously. Configurations are still distinguished after the exchange of their identifiers. The identifiers may be deleted. A configuration from which an identifier is deleted is distinguished by a reference sign. Identifiers terms such as "first" and "second" in the present disclosure should not be solely used for interpretation of the order of the configurations, or as a basis for the presence of a smaller number identifier and the presence of a larger number identifier.

REFERENCE SIGNS LIST

1 Wireless communication module
2 Wireless communication device
3 Substrate
10, 11, 110 Antenna
12 RF module
13A Ground conductor
13B Printed circuit board
14 Circuit board
15 Sensor
16 Battery
17 Memory
18 Controller
19 Housing
19*a* Upper surface

19*b* Lower surface
19A First housing
19B Second housing
19C Conductive member
20 Base
21 Upper surface
22 Lower surface
31 First antenna element
32 Second antenna element
41 First radiation conductor
42 Second radiation conductor
41A, 42A First end portion
41B, 42B Second end portion
41*a*, 42*a* Long side
41*b*, 42*b* Short side
51 First feed line
52 Second feed line
60 Ground conductor
61 First ground conductor
62 Second ground conductor
61*a*, 62*a* Opening
71, 170, 171, 172 First coupling body
72, 173, 174, 175 Second coupling body
73, 176, 177, 178 Third coupling body
131, 132, 133, 134 Antenna element
141, 142, 143, 144 Radiation conductor
141A, 142A, 143A, 144A, 141B, 142B, 143B, 144B End portion
151, 142, 153, 154 Feed line

The invention claimed is:

1. An antenna, comprising:

a first antenna element comprising a first radiation conductor and a first feed line, the first antenna element being configured to resonate in a first frequency band;

a second antenna element comprising a second radiation conductor and a second feed line, the second antenna element being configured to resonate in a second frequency band;

a first coupling body; and a second coupling body, wherein the first radiation conductor and the second radiation conductor are arranged side by side at an interval that is equal to or shorter than ½ of a resonance wavelength, the second radiation conductor is coupled to the first radiation conductor under a first coupling mode in which one of capacitive coupling and magnetic field coupling is dominant, the first coupling body couples a first end portion of the first radiation conductor on a side of a first direction and a first end portion of the second radiation conductor on the side of the first direction to each other under a second coupling mode different from the first coupling mode, the second coupling body couples a second end portion of the first radiation conductor opposite to the first end portion and a second end portion of the second radiation conductor opposite to the first end portion to each other under the second coupling mode, the second feed line is coupled to the first feed line with any one of a capacitance component and an inductance component being dominant, the second feed line is coupled to the first feed line with the inductance component being dominant, and the antenna further comprises a third coupling body, the third coupling body configured to directly short-circuit the first feed line and the second feed line and alternately open the first feed line and the second feed line.

2. The antenna according to claim 1, wherein the first frequency band and the second frequency band belong to an identical frequency band.

3. The antenna according to claim 1, wherein the first frequency band and the second frequency band belong to different frequency bands.

4. The antenna according to claim 1, wherein the first antenna element further comprises a first ground conductor.

5. The antenna according to claim 4, wherein the second antenna element further comprises a second ground conductor.

6. The antenna according to claim 5, wherein the first ground conductor is connected to the second ground conductor.

7. The antenna according to claim 5, wherein the first ground conductor and the second ground conductor are integral with each other, and the first ground conductor and the second ground conductor are integral with a single base.

8. The antenna according to claim 1, further comprising:

a plurality of antenna elements comprising the first antenna element and the second antenna element, wherein the plurality of antenna elements are arranged side by side along a second direction intersecting with the first direction.

9. The antenna according to claim 8, wherein the plurality of antenna elements are arranged side by side at an interval that is equal to or shorter than ¼ of the resonance wavelength, along the second direction.

10. The antenna according to claim 8, wherein the plurality of antenna elements comprise: an n-th antenna element comprising an n-th radiation conductor and an n-th feed line, the n-th antenna element being configured to resonate in the first frequency band, wherein n is an integer equal to or larger than 3, and the n-th radiation conductor and the first radiation conductor are arranged side by side at an interval that is equal to or shorter than ½ of a resonance wavelength, in the second direction.

11. The antenna according to claim 10, wherein the n-th radiation conductor is directly or indirectly coupled to the second radiation conductor.

12. The antenna according to claim 8, wherein the plurality of antenna elements comprise a plurality of radiation conductors, adjacent radiation conductors of the plurality of radiation conductors are coupled to each other under the first coupling mode, the first coupling body couples end portions of the adjacent radiation conductors on the side of the first direction to each other under the second coupling mode, and the second coupling body couples end portions of the adjacent radiation conductors opposite to the end portions on the side of the first direction to each other under the second coupling mode.

13. The antenna according to claim 8, wherein the plurality of antenna elements are each supplied with a signal that causes excitation of the plurality of antenna elements in an identical phase.

14. The antenna according to claim 8, wherein the plurality of antenna elements are each supplied with a signal that causes excitation of the plurality of antenna elements in different phases.

15. The antenna according to claim 1, wherein at least one of the first coupling body or the second coupling body is positioned in a plane different from a plane where the first radiation conductor and the second radiation conductor are arranged, and the first coupling body is positioned in a first plane parallel to the plane where the first radiation conductor and the second radiation conductor are arranged.

16. The antenna according to claim 15, wherein the second coupling body is positioned in a second plane parallel to the plane where the first radiation conductor and the second radiation conductor are arranged, the first plane being different from the second plane.

17. A wireless communication module, comprising:

an antenna including:

a first antenna element comprising a first radiation conductor and a first feed line, the first antenna element being configured to resonate in a first frequency band;

a second antenna element comprising a second radiation conductor and a second feed line, the second antenna element being configured to resonate in a second frequency band;

a first coupling body; and a second coupling body, wherein the first radiation conductor and the second radiation conductor are arranged side by side at an interval that is equal to or shorter than ½ of a resonance wavelength, the second radiation conductor is coupled to the first radiation conductor under a first coupling mode in which one of capacitive coupling and magnetic field coupling is dominant, the first coupling body couples a first end portion of the first radiation conductor on a side of a first direction and a first end portion of the second radiation conductor on the side of the first direction to each other under a second coupling mode different from the first coupling mode, the second coupling body couples a second end portion of the first radiation conductor opposite to the first end portion and a second end portion of the second radiation conductor opposite to the first end portion to each other under the second coupling mode, the second feed line is coupled to the first feed line with any one of a capacitance component and an inductance component being dominant, the second feed line is coupled to the first feed line with the inductance component being dominant, and the antenna further comprises a third coupling body, the third coupling body configured to directly short-circuit the first feed line and the second feed line and alternately open the first feed line and the second feed line; and an RF module electrically connected to at least one of the first feed line and the second feed line.

18. A wireless communication device, comprising:

a wireless communication module; and a battery configured to supply power to the wireless communication module, wherein the wireless communication module includes:

an antenna including:

a first antenna element comprising a first radiation conductor and a first feed line, the first antenna element being configured to resonate in a first frequency band;

a second antenna element comprising a second radiation conductor and a second feed line, the second antenna element being configured to resonate in a second frequency band;

a first coupling body; and a second coupling body, wherein the first radiation conductor and the second radiation conductor are arranged side by side at an interval that is equal to or shorter than ½ of a resonance wavelength, the second radiation conductor is coupled to the first radiation conductor under a first coupling mode in which one of capacitive coupling and magnetic field coupling is dominant, the first coupling body couples a first end portion of the first radiation conductor on a side of a first direction and a first end portion of the second radiation conductor on the side of the first direction to each other under a second coupling mode different from the first coupling mode, the second coupling body couples a second end portion of the first radiation conductor opposite to the first end portion and a second end portion of the second radiation conductor opposite to the first end portion to each other under the second coupling mode, the second feed line is coupled to the first feed line with any one of a capacitance component and an inductance component being dominant, the second feed line is coupled to the first feed line with the inductance component being dominant, and the antenna further comprises a third coupling body, the third coupling body configured to directly short-circuit the first feed line and the second feed line and alternately open the first feed line and the second feed line; and an RF module electrically connected to at least one of the first feed line and the second feed line.

* * * * *